United States Patent
Hoskins

(10) Patent No.: US 6,925,580 B2
(45) Date of Patent: Aug. 2, 2005

(54) FULL VOLUME SLIP DEFECT MANAGEMENT IN A DISC DRIVE

(75) Inventor: Edward Sean Hoskins, Longmont, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 443 days.

(21) Appl. No.: 09/727,031

(22) Filed: Nov. 29, 2000

(65) Prior Publication Data

US 2001/0042223 A1 Nov. 15, 2001

Related U.S. Application Data

(60) Provisional application No. 60/169,019, filed on Dec. 3, 1999.

(51) Int. Cl.[7] .............................................. G06F 11/00
(52) U.S. Cl. ......................... 714/8; 714/42; 369/47.14; 369/53.15; 369/53.17
(58) Field of Search ............................... 714/8, 54, 42, 714/53.15, 53.17, 5, 47.14; 369/47.14, 53.15, 53.17; 711/202, 206; 360/53, 48

(56) References Cited

U.S. PATENT DOCUMENTS

| | | |
|---|---|---|
| 4,914,529 A | 4/1990 | Bonke |
| 5,748,885 A | 5/1998 | Gallagher |
| 5,829,018 A | 10/1998 | Moertl et al. |
| 5,835,930 A | 11/1998 | Dobbek |
| 5,848,438 A | 12/1998 | Nemazie et al. |
| 5,983,309 A | 11/1999 | Atsatt et al. |
| 6,134,214 A * | 10/2000 | Takagi et al. ............. 369/47.14 |
| 6,201,655 B1 * | 3/2001 | Watanabe et al. ............. 360/53 |
| 6,223,310 B1 * | 4/2001 | Sasaki et al. ................ 714/710 |
| 6,453,384 B1 * | 9/2002 | Park et al. .................. 711/112 |
| 6,469,978 B1 * | 10/2002 | Ohata et al. .............. 369/275.3 |
| 6,480,446 B1 * | 11/2002 | Ko ........................... 369/47.14 |
| 6,546,502 B1 * | 4/2003 | Ishi ............................... 714/7 |
| 2001/0043525 A1 * | 11/2001 | Ito et al. ................... 369/47.14 |
| 2001/0044873 A1 * | 11/2001 | Wilson et al. .................. 711/4 |
| 2002/0004884 A1 * | 1/2002 | Yamakawa et al. ......... 711/112 |

* cited by examiner

Primary Examiner—Robert Beausoliel
Assistant Examiner—Yolanda L Wilson
(74) Attorney, Agent, or Firm—Kirk A. Cesari

(57) ABSTRACT

A method and device for mapping an inherently defective sectors or newly-identified defective sectors in a disc drive to a good sector in the disc drive in such a way that data fragmentation is minimized and that speed efficiency in accessing the data stored in the disc drive is improved due to minimized seek time and latency delays. In a disc drive data storage area of sectors, user spare sectors are located not at the end of a track, a cylinder, or a segment but at the end of the data storage area. Any defective user data sector is slipped to the next closest good sector over the full volume of the data storage area. That is, the data that would have been stored in the defective sector is pushed down to the next good sector, as each of the subsequent sectors are slipped sequentially to the next good sector in the full volume of the data storage area. A user sector slip list is generated to access the full volume slipped data storage area. Newly-identified defective sectors are redirected to good sectors in reserve data area in the data storage area of sectors. An alternate sector list is maintained to facilitate an access to a redirected reserve data area.

17 Claims, 19 Drawing Sheets

| PCHS | | | UPBA |
|---|---|---|---|
| 0 | 0 | 3 | 3 |
| 0 | 0 | 5 | 5 |
| 0 | 0 | 6 | 6 |
| 0 | 0 | 9 | 9 |
| 0 | 1 | 2 | 17 |
| 0 | 1 | 4 | 19 |
| 0 | 1 | 5 | 10 |
| 0 | 1 | 6 | 11 |

Fig. 10-1

| PCHS | | | UPBA |
|---|---|---|---|
| 0 | 0 | 3 | 3 |
| 0 | 0 | 5 | 5 |
| 0 | 0 | 6 | 6 |
| 0 | 0 | 9 | 9 |
| 0 | 1 | 5 | 10 |
| 0 | 1 | 6 | 11 |
| 0 | 1 | 2 | 17 |
| 0 | 1 | 4 | 19 |

Fig. 10-2

| PCHS | | | UPBA | Next Good LBA |
|---|---|---|---|---|
| 0 | 0 | 3 | 3 | 3 |
| 0 | 0 | 5 | 5 | 4 |
| 0 | 0 | 6 | 6 | 4 |
| 0 | 0 | 9 | 9 | 6 |
| 0 | 1 | 5 | 10 | 6 |
| 0 | 1 | 6 | 11 | 6 |
| 0 | 1 | 2 | 17 | 11 |
| 0 | 1 | 4 | 19 | 12 |

Fig. 10-3

| Next Good LBA | Slip Count |
|---|---|
| 3 | 1 |
| 4 | 2 |
| 4 | 3 |
| 6 | 4 |
| 6 | 5 |
| 6 | 6 |
| 11 | 7 |
| 12 | 8 |

Fig. 10-4

| PBA to Zone Assignment ||| HEAD SKEW = 5 |
|---|---|---|---|
| UPBA | ZONE | CYL | |
| | | | CYLINDER SKEW = 5 |
| 0-99 | 0 | 0-4 | Sectors per head = 10 per each zone |
| 100-199 | 1 | 5-9 | |
| 200-299 | 2 | 10-14 | HEADS PER CYL. = 2 |
| 300-399 | 3 | 15-19 | |
| 400-499 | 4 | 20-24 | Cylinder Skip 1 5 8 10 |
| . | . | . | |
| . | . | . | |
| 1600-1699 | 16 | 80-84 | |

Fig. 10-5

| Reserve Sector (PCHS) | | | Redirected Data | Alt. Sector Offset |
|---|---|---|---|---|
| 0 | 0 | 0 | data #1 | 0 |
| 0 | 0 | 1 | data #2 | 1 |
| 0 | 0 | 2 | data #3 | 2 |
| 0 | 0 | 3 | (Bad Sector) | X |
| 0 | 0 | 4 | data #9 | 3 |
| 0 | 0 | 5 | data #5 | 4 |
| 0 | 0 | 6 | data #7 | 5 |
| 0 | 0 | 7 | data #11 | 6 |
| 0 | 0 | 8 | Spare | X |
| 0 | 0 | 9 | Spare | X |
| 0 | 1 | 0 | data #10 | 7 |
| 0 | 1 | 1 | data #4 | 8 |
| 0 | 1 | 2 | data #6 | 9 |
| 0 | 1 | 3 | data #8 | 10 |
| 0 | 1 | 4 | data #12 | 11 |

FIG. 17-1

| Alternate Sector List Header | |
|---|---|
| Seq. | Pointer to the next entry in the Alternated Slip List |
| $t_0$ | 3 |
| $t_1$ | 6 |
| $t_2$ | 1 |
| $t_3$ | 2 |
| $t_4$ | 0 |
| $t_5$ | 5 |
| $t_6$ | 8 |
| $t_7$ | 4 |
| $t_8$ | 7 |
| $t_9$ | 9 |

FIG. 17-2

| Alternate Sector Entry List | | |
|---|---|---|
| Entry number | Alternate Sector Offset | Next Entry Pointer |
| 0 | 4 | 5 |
| 1 | 2 | 2 |
| 2 | 8 | 0 |
| 3 | 0 | 6 |
| 4 | 10 | 7 |
| 5 | 9 | 8 |
| 6 | 1 | 1 |
| 7 | 3 | 9 |
| 8 | 5 | 4 |

FIG. 17-3

FULL VOLUME SLIP DEFECT MANAGEMENT IN A DISC DRIVE

RELATED APPLICATIONS

This application claims the benefit of priority of U.S. Provisional Patent Application Ser. No. 60/169,019 filed Dec. 03, 1999 and titled "IMPLEMENTATION OF FULL SLIP DEFECT MANAGEMENT."

FIELD OF THE INVENTION

This invention generally relates to data storage management in a disc drive having defective sectors and more particularly to a system and method for full volume defect slipping of logical block addresses of defective sector locations and accessing the slipped locations in the disc drive.

BACKGROUND OF THE INVENTION

Disc drives are data storage devices that store digital data in magnetic form on a rotating storage medium called a disc. Modem disc drives comprise one or more rigid discs that are coated with a magnetizable medium and mounted on the hub of a spindle motor for rotation at a constant high speed. Each surface of a disc is divided into several thousand tracks that are tightly-packed concentric circles similar in layout to the annual growth rings of a tree. The tracks are typically numbered starting from zero at the track located outermost the disc and increasing for tracks located closer to the center of the disc. Each track is further broken down into sectors. A sector is normally the smallest individually addressable unit of information stored in a disc drive and typically holds 512 bytes of information plus a few additional bytes for internal drive control and error detection and correction. This organization of data allows for easy access to any part of the discs.

Generally, each of the multiple discs in a disc drive has associated with it two heads (one adjacent the top surface of the disc, and another adjacent the bottom) for reading and writing data to a sector. A typical disc drive has two or three discs. This usually means four or six heads in a disc drive carried by a set of actuator arms. Data is accessed by moving the heads from the inner to outer part of the disc (and vice-versa) driven by an actuator assembly. The heads that access sectors on discs are locked together on the actuator assembly. For this reason, all the heads move in and out together and are always physically located at the same track number (e.g., it is impossible to have one head at track 0 and another at track 500). Because all the heads move together, each of the tracks on all discs is known as a cylinder for reasons that these tracks form a cylinder since they are equal-sized circles stacked one on top of the other in space. So, for example, if a disc drive has four discs, it would normally have eight heads, and a cylinder number 680 would be made up of a set of eight tracks, one per disc surface, at track number 680. Thus, for most purposes, there is not much difference between tracks and cylinders since a cylinder is basically a set of all tracks whereat all the heads are currently located.

One of the heads must first be positioned over the correct location of a sector on the disc in order to access (i.e., read or write) the sector. This requires the heads to move to the correct track and then wait for the correct sector to pass under the appropriate head. Moving the heads to the correct track is measured by seek time. Waiting for a correct sector to pass under the appropriate head is measured by latency. Seek time and latency are two very important disc drive performance measurements. Seek time measures the amount of time required for the heads to move between tracks. Generally, the amount of time to switch between two tracks depends on the distance between the tracks; however, the relationship is not linear due to a certain amount of overhead involved in track switching. Latency, on the other hand, measures the time that the disc drive must wait for the correct sector to come around to where one of the heads is waiting for it. At the time the appropriate head arrives at and begins to follow the correct track, the actual sector for read or write may be located elsewhere on the disc spinning around at high speed. This causes a latency delay since the servo system must wait for the correct sector to arrive under the head.

A seek time delay and a latency delay are normally expressed in milliseconds. In a computing system, a millisecond is an enormous amount of time when the system memory speed is measured in nanoseconds. For example, a 200 MHz processor can theoretically execute 200,000 instructions in a millisecond. Thus, cutting the seek time and/or latency delays result in significant performance improvement in a computing system, because the computing system can execute a significant number of instructions instead of waiting for movement of the heads to a track or waiting for a correct sector to pass under one of the heads.

Particularly, storing data in a contiguous block of sectors on a track in a disc drive reduces latency. For example, latency is relatively a minor factor for reading or writing a large contiguous block of data on a track since the latency will only occur once while waiting to access the first sector of data. On the other hand, latency is an important performance-limiting factor for reading or writing noncontiguous multiple data blocks on a track.

Every sector in a disc drive is a good sector in an ideal world; however, typical disc drives contain unusable sectors when they are manufactured, because it is virtually impossible to create a disc drive with several million sectors and not have some errors. Imperfections in the media coating on the disc or other problems, for example, may make a sector inoperable. This usually shows up as an error when attempting to read the sector. Modern disc drives use an error correction code to help identify when errors occur and in some cases to correct them; however, there will still be physical flaws that prevent parts of a disc from being used. These unusable sectors, due to such physical flaws, are called defective sectors.

When defective sectors are discovered in the data storage area of a disc drive, each of the memory locations corresponding to the defective sectors are mapped to a good sector in another part of the data storage area. For this mapping purpose, spare sectors are reserved in a disc drive as substitutes for those defective sectors. Typically, each track has one spare sector at the end of the track. A disc drive controller keeps track of all defective sectors in the disc drive and automatically substitutes each of the defective sectors with a spare sector. When a host controller sends a command to read data from or write data to a defective sector, the disc drive controller seeks to the designated substitute sector taken from the pool of spare sectors rather than seeking to the defective sector. This technique is known as spare sectoring (or defect mapping) and causes defective sectors to be transparent to a user. In selecting a spare sector as a substitute, the disc drive controller always tries to use the spare sector on the same track to avoid a seek time delay associated with track switching. Nevertheless, a seek time delay cannot be avoided if more defective sectors are present on the track than available spare sectors on that track.

Moreover, in most cases, mapping a defective sector to a spare sector causes fragmentation of data. Once data is fragmented, each fragment of data introduces a latency delay to locate the beginning sector of each fragment and, if the next fragment starts on a different track, an additional seek time delay is introduced. Thus, there is a big performance difference between accessing data that is laid out contiguously on a disc and that is fragmented into a dozen pieces. In any case, greater seek time and/or latency causes slower access to data stored in a disc drive.

Many types of spare sectoring techniques are known to those skilled in the art, and they include linear replacement, sector slipping, circular slipping, and segment slipping. The linear replacement technique maps each defective sector to a good spare sector located somewhere else in the disc drive. However, this technique causes the heads to jump from the defective sector to the substituted spare sector and then back to the defective sector in order to access the data in a consecutive order. A series of such required head jumps significantly degrades the system performance by adding considerable latency and seek time delays.

The sector slipping technique maintains a pool of spare sectors assigned to each track. Instead of mapping a defective sector to a spare sector located at the end of the track, this technique slips each of the defective sectors to the next closest available good sector. For example, if sector 3 is flagged as bad, the data that would have been stored there is pushed down and recorded in sector 4. The sector 4 then effectively becomes the sector 3, as each of the subsequent sectors is slipped sequentially to the next good sector on the track. The first spare sector located at the end of the track then makes up for the loss of sector 3, and so maintains the sequential order of data. This technique attempts to maintain contiguity of data within a track; however, the contiguity is broken when the number of defective sectors on the track is greater than the number of spare sectors assigned to the track. Once all spare sectors are used up, the remaining additional defective sectors cannot be slipped on the same track. In such a case, the remaining defective sectors are mapped to good sectors located on another track using, for example, the linear replacement technique as described above. Once the contiguity of data is broken, the system performance is degraded due to latency delay and seek time delay associated with accessing the fragmented data, as it is the case in the linear replacement technique.

The circular slipping technique slips all defective sectors on a track even if the number of defective sectors exceed the number of available spare sectors assigned to the track. In case the number of defective sectors exceed the number of spare sectors, some of the defective sectors are then used as a logical sector to ensure that the host controller understands that the same number of usable sectors are maintained on the track. Then the defective sector, which is used as a logical sector, is flagged as defective and is mapped to a substituting sector somewhere else in the disc drive. For example, if sectors 3 and 4 are bad on a track assigned with only one spare sector, the defective sector 3 is slipped to sector 5, and the defective sector 4 is slipped to sector 6, as the subsequent sectors are sequentially slipped. Because there is one less spare sector available, the last sector on the track wraps around the track and circularly slips to the defective sector 3, so that the constant number of usable sectors are maintained on the track. Since the sector 3 is defective, the sector 3 is then flagged as bad and is mapped to a good sector located somewhere else on the drive. As was the case in the sector slipping technique, the circular slipping technique introduces data fragmentation, and the system performance is also degraded due to the latency and seek time delays associated with accessing the noncontiguous data.

The segment slipping technique is similar to the circular slipping technique, except that the defective sectors are circularly slipped over a segment instead of over a track. A segment is a set of logically related tracks (such as a cylinder), which are positioned adjacent to each other in a disc drive. The segment is treated as one contiguous storage space such that a defective sector is slipped to a next good sector within the segment. If the number of defective sectors for the segment exceeds the number of spare sectors included in the segment, the remainder of the defective sectors are mapped to substituting sectors somewhere else in the disc drive. The concept of circular slipping can be applied to segment slipping. Once the defective sectors within the segment exceed the spare sectors per segment, the remaining logical sectors are slipped to the defective sectors starting from the first defective sector within the segment. A special case of segment slipping is cylinder slipping where the segment is a cylinder of the disc drive. Again as was the case in the sector slipping technique, the segment slipping technique introduces data fragmentation, and thus the system performance is degraded due to the latency and seek time delays associated with accessing noncontiguous data.

These prior attempts to map defective sectors to different locations in a disc drive result in data fragmentation and create system inefficiencies due to associated latency and seek time delays. What is needed is a method and system that eliminates or at least minimizes the fragmentation of data in a disc drive and thus improves the system performance by reducing latency and seek time delay in accessing data stored in a disc drive.

SUMMARY OF THE INVENTION

Against this backdrop, the present invention has been developed. The present invention essentially is a system and method of minimizing seek time delay and latency delay mainly caused by data fragmentation due to inherent defective sectors in a disc drive and/or newly-identified defective sectors discovered, for example, during the use of a disc drive. Thus, the present invention improves the speed efficiency in accessing data stored in sectors in a disc drive by mapping the defective sectors in the disc drive to good sectors in such a way that data fragmentation does not occur or is minimized. This is done by uniquely slipping logical addresses corresponding to a defective sector to a next available good sector over a full volume of the data storage area in a disc drive. Basically, the method of the present invention is a method of full volume slipping of logical block addresses in a disc drive.

There is one preferred embodiment by which this can be achieved in a disc drive that is presently envisioned. However, other means will also become apparent to those skilled in the art upon reading the following description. This embodiment basically involves fill volume slipping of logical addresses in both reserve data area and user data area. That is, full volume slipping of logical addresses can be performed on any group of sectors in a disc drive, whether that group is a user data area or a reserve data area.

These and various other features as well as advantages that characterize the present invention will be apparent from a reading of the following detailed description and a review of the associated drawings.

BRIEF DESCRIPTION OF THE DRAWINGS

FIGS. 10-1, 10-2, 10-3, and 10-4 are tables illustrating the organization of user sector slip list in accordance with a preferred embodiment of the invention.

FIG. 10-5 is a PBA Zone Table according to a preferred embodiment of the invention.

FIGS. 15-1, 15-2, and 15-3 a detailed data access flow chart in a disc drive with full volume slipping and alternated sector slipping in accordance with a preferred embodiment of the invention.

FIGS. 17-1, 17-2, and 17-3 are tables illustrating how a alternated sector list are used by a disc drive controller in accordance with a preferred embodiment of the invention.

DETAILED DESCRIPTION

Figure 1:
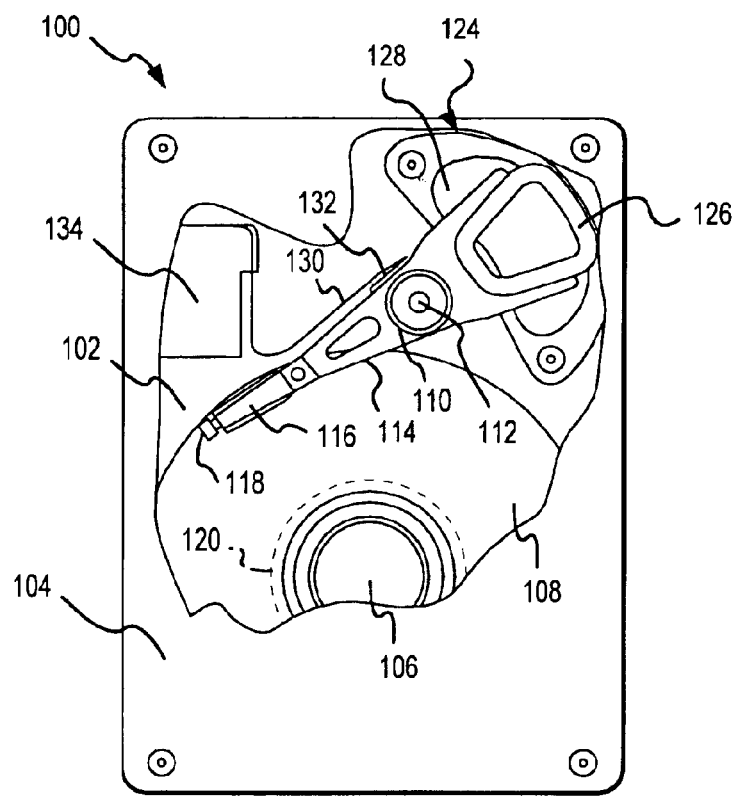
FIG. 1 is a plan view of a disc drive in accordance with a preferred embodiment of the invention.

A disc drive 100 constructed in accordance with a preferred embodiment of the present invention is shown in FIG. 1. The disc drive 100 includes a base 102 to which various components of the disc drive 100 are mounted. A top cover 104, shown partially cut away, cooperates with the base 102 to form an internal, sealed environment for the disc drive in a conventional manner. The components include a spindle motor 106, which rotates one or more discs 108 at a constant high speed. Information is written to and read from tracks on the discs 108 through the use of an actuator assembly 110, which rotates during a seek operation about a bearing shaft assembly 112 positioned adjacent the discs 108. The actuator assembly 110 includes a plurality of actuator arms 114 which extend towards the discs 108, with one or more flexures 116 extending from each of the actuator arms 114. Mounted at the distal end of each of the flexures 116 is a head 118, which includes an air bearing slider enabling the head 118 to fly in close proximity above the corresponding surface of the associated disc 108.

The track position of the heads 118 is controlled, during a seek operation, through the use of a voice coil motor (VCM) 124, that typically includes a coil 126 attached to the actuator assembly 110, as well as one or more permanent magnets 128 that establish a magnetic field in which the coil 126 is immersed. The controlled application of current to the coil 126 causes magnetic interaction between the permanent magnets 128 and the coil 126 so that the coil 126 moves in accordance with the well-known Lorentz relationship. As the coil 126 moves, the actuator assembly 110 pivots about the bearing shaft assembly 112, and the heads 118 are caused to move across the surfaces of the discs 108.

The spindle motor 106 is typically de-energized when the disc drive 100 is not in use for extended periods of time. The heads 118 are moved over park zones 120 near the inner diameter of the discs 108 when the drive motor is de-energized. The heads 118 are secured over the park zones 120 through the use of an actuator latch arrangement, which prevents inadvertent rotation of the actuator assembly 110 when the heads are parked.

A flex assembly 130 provides the requisite electrical connection paths for the actuator assembly 110 while allowing pivotal movement of the actuator assembly 110 during operation. The flex assembly includes a preamplifier 132 to which head wires (not shown) are connected; the head wires being routed along the actuator arms 114 and the flexures 116 to the heads 118. The printed circuit board 132 typically includes circuitry for controlling the write currents applied to the heads 118 during a write operation and a preamplifier for amplifying read signals generated by the heads 118 during a read operation. The flex assembly terminates at a flex bracket 134 for communication through the base deck 102 to a disc drive printed circuit board (not shown) mounted to the bottom side of the disc drive 100.

Figure 2:
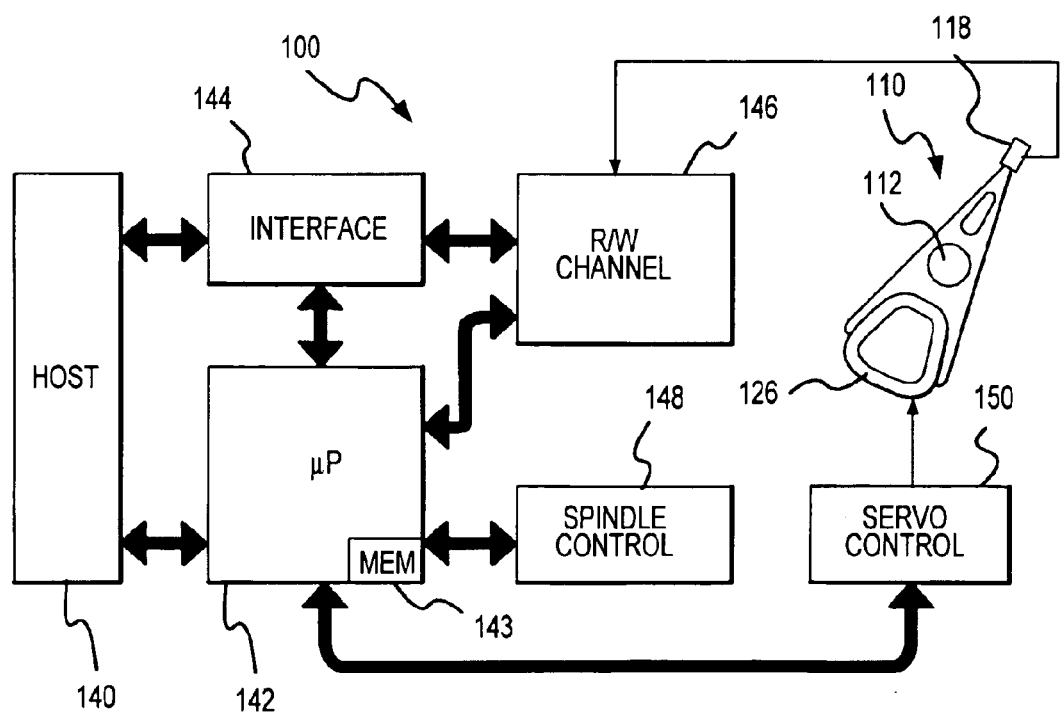
FIG. 2 is a simplified block diagram of a disc drive and its connection to the host computer system including a servo system with which the present invention is particularly useful.

Referring now to FIG. 2, shown therein is a functional block diagram of the disc drive 100 of FIG. 1, generally showing the main functional circuits, which are resident on the disc drive printed circuit board and used to control the operation of the disc drive 100. The disc drive 100 is shown in FIG. 2 to be operably connected to a host computer 140 in which the disc drive 100 is mounted in a conventional manner. Control communication paths are provided between the host computer 140 and a disc drive controller 142, the controller 142 generally providing top level communication and control for the disc drive 100 in conjunction with programming for the controller 142 stored in controller memory (MEM) 143. The MEM 143 can include random access memory (RAM), read only memory (ROM), and other sources of resident memory for the controller 142.

The discs 108 are rotated at a constant high speed by a spindle control circuit 148, which typically electrically commutates the spindle motor 106 (FIG. 1) through the use of back electromotive force (BEMF) sensing. During a seek operation, the track position of the heads 118 is controlled through the application of current to the coil 126 of the actuator assembly 110. A servo control circuit 150 provides such control. During a seek operation the microprocessor 142 receives information regarding the velocity and acceleration of the head 118, and uses that information in conjunction with a model, stored in memory 143, to communicate with the servo control circuit 150, which will apply a controlled amount of current to the voice coil motor 126, thereby causing the actuator assembly 110 to be pivoted.

Data is transferred between the host computer 140 and the disc drive 100 by way of a disc drive interface 144, which typically includes a buffer to facilitate high speed data transfer between the host computer 140 and the disc drive 100. The disc drive interface 144 includes a bi-directional data bus, an address bus for passing "logical block addresses" (LBAs) from the host computer 140 to the disc drive 100, a command bus, and a status bus. Data to be written to the disc drive 100 are thus passed from the host computer to the interface 144 and then to a read/write channel 146, which encodes and serializes the data and provides the requisite write current signals to the heads 118. To retrieve data that has been previously stored by the disc drive 100, read signals are generated by the heads 118 and provided to the read/write channel 146, which performs decoding and error detection and correction operations and outputs the retrieved data to the interface 144 for subsequent transfer to the host computer 140.

Figure 3:
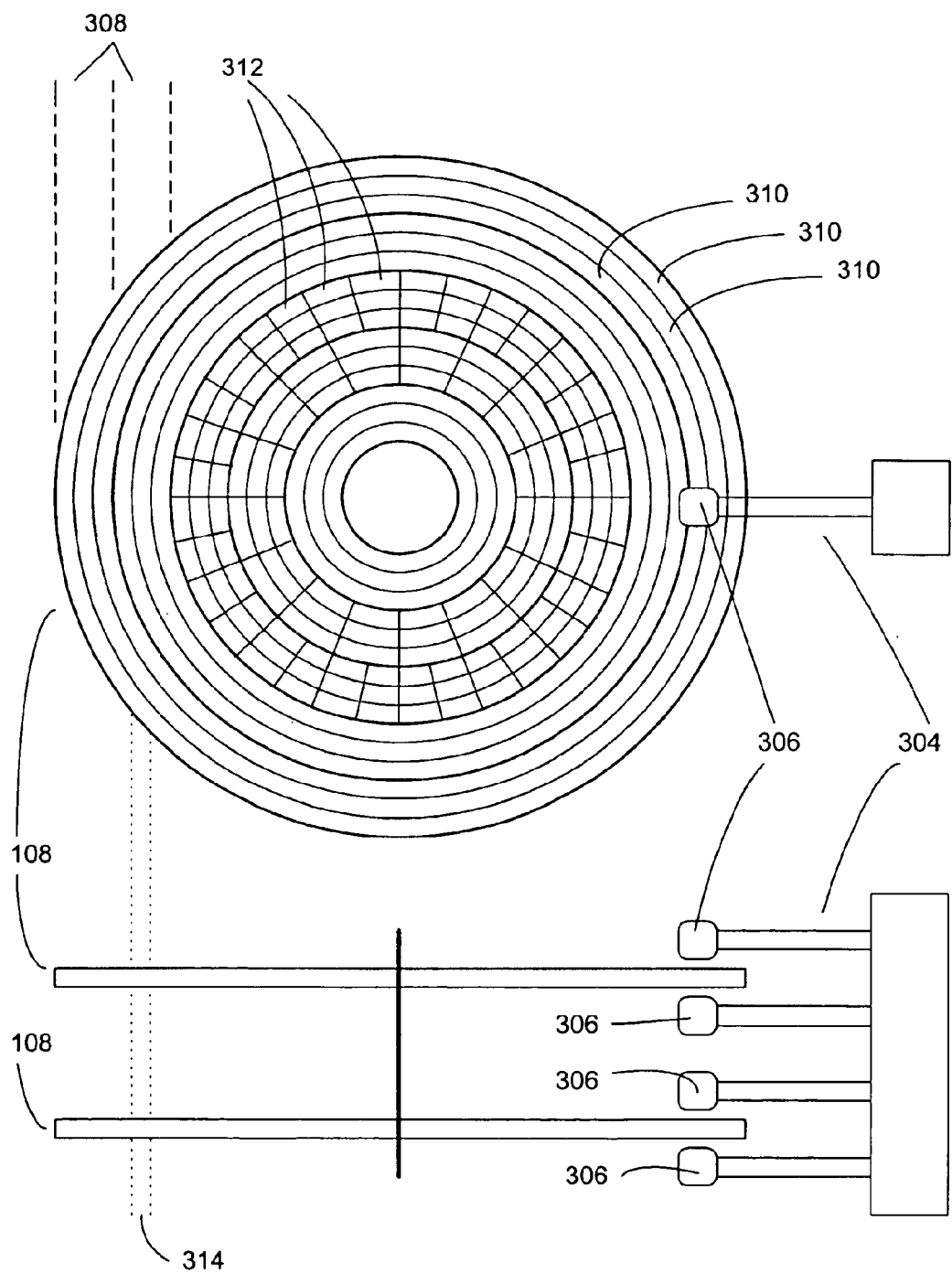
FIG. 3 is a simplified representation illustrating the organization of data storage elements in a disc drive.

FIG. 3 generally illustrates the organization of the data storage area in a disc drive. The surface of a disc 108 is organized into zones 308, tracks 310, and sectors 312 for organized data storage and retrieval in a sector. The zone 308 is a set of concentric tracks 310, and a track 310 is divided into sectors 312. Because the tracks 310 on the outer part of the disc 108 are longer than the inner counterparts, a zoned-bit recording technique (ZBR) is used to allocate a larger number of sectors 312 to the outer tracks than to the inner tracks. The ZBR groups a number of contiguous tracks into a zone 308 based on the radial distance between each track and the center of the disc. Each track 310 in the outer zone has more sectors than a track in the inner zone. In a preferred embodiment of the present invention, the same number of tracks is maintained in each zone, and the same number of sectors 312 are maintained in each track within a zone; however, this is not a requirement. Typically, a disc may be organized into 16 zones that are numbered ascending from zone 0, the outermost zone, to the inner zones 15. zone 0 has the largest number of sectors per track, and zone 15 has the smallest number of sectors per track. ZBR allows improvement of data storage capacity in a disc drive by increasing data storage on the longer outer tracks on the disc.

The positions of the zones 308, the tracks 310, and the sectors 312 on discs in a disc drive are defined during a low-level formatting process. Generally, all disc drives are low-level formatted at the factory because the disc drives use many complex internal servo and data organizational structures, including the ZBR, to put more sectors on the outer tracks than on the inner ones and to incorporate embedded servo data to control the positioning of the actuator assembly.

A time delay inherently occurs when the set of heads 118 is switched between tracks or cylinders for reading or writing data from or to a sector in a disc drive. In reading the entire contents of two consecutive tracks or cylinders, for example, the head 118 must physically move to the second track after reading all sectors on the first track. By the time the head is positioned over the second track, the first few sectors on the second track have already passed beneath the head. A latency delay would incur if the actuator assembly had to wait for an entire revolution of the disc so that the first sector on the second track would return beneath the appropriate head. This delay is avoided by physically offsetting the starting sector on the second track, and this offset of sectors is called a track "skew" or a cylinder "skew" (e.g., placing the first sector on the second track adjacent to the fifth sector of the first track).

A similar time delay is incurred when changing between two heads in a cylinder because it still takes time for the switch to be made from reading one head 118 to reading another although there is no physical movement of heads 118. Thus, the starting sector 312 of each track 310 in the same cylinder is also offset so that the head can access two sequential tracks in the same cylinder without a time delay, and this offset of sectors is called a "head" skew. Typically, a smaller number of sectors 312 are offset in a head skew than in a cylinder skew because switching heads generally takes less time than switching cylinders.

In addition to the cylinder skew and head skew techniques, a head serpentine technique is employed to minimize the delay associated with switching heads between two or more consecutive cylinders. Generally, the heads 118 are numbered from the top disc 118 to the bottom disc 108 in a cylinder (e.g., in a disc drive with two discs, the head over the top surface of the first disc may be numbered 0 and the head over the bottom surface of the second disc may be numbered 3), and the tracks 310 in a cylinder are accessed via the corresponding head 118 in that order. Thus, when reading all sectors on two consecutive cylinders in a disc drive 100 with two discs 108, all sectors located on the head 0 (i.e., on the track under the head 0) is accessed first, and the sectors on the track under head 3 is accessed last. For reading the second cylinder, the tracks are accessed in the reverse order (i.e., head 3 is accessed first and head 0 is accessed last) such that the time delay that would be associated with switching between the head 3 of the first cylinder and the head 0 of the second cylinder can be eliminated. Thus, the heads are not switched when switching between the two consecutive cylinders. This is known as the head serpentine technique.

Further, some cylinders in a disc drive may not be used due to, for example, too may physical flaws on the cylinder, or simply the design choice, and such cylinders are not accessed. This is known as a skip cylinder technique. For example, if the middle cylinder among three consecutive cylinders is chosen to be skipped, the head will move from the first cylinder directly to the last cylinder without accessing the middle cylinder. The cylinder skip, the head serpentine, the head skew, and the cylinder or track skew techniques minimize the time delays associated with head-to-head switching, track-to-track switching, and cylinder-to-cylinder switching.

Every sector 312 in a disc drive 100 is assigned a physical cylinder head sector address (PCHS). For example, a PCHS of (323, 3, 485) means the $485^{th}$ sector from the index mark of a track under the head number 3 of a cylinder number 323. The disc drive controller 142 uses a PCHS to access information stored in a sector 312 through the use of the actuator assembly 110. The computer processor (CPU) 140 and the disc drive 100 communicate through the disc drive controller 142. The CPU, however, accesses sectors by their logical block addresses (LBAs), and the disc drive controller 142 in turn has to translate the LBA into the PCHS. In translating a LBA into a PCHS, the disc drive controller 142 keeps tab on all sectors 312 by assigning a physical block address (PBA) to each sector in a disc drive 100. Every sector 312 in a disc drive 100 therefore has a PCHS and a PBA; however, not every sector (e.g., a defective sector) is assigned an LBA. The disc drive controller 142 maintains the mapping scheme between an LBA and a PBA corresponding to a particular sector 312, and once a proper PBA is obtained, the disc drive controller 142 translates the PBA, into a PCHS in order to access the sector.

Modem disc drives 100 use error correction coding (ECC) to identify when errors occur in accessing servo information or data in a sector and in some cases to correct these errors; however, some defective sectors in a disc drive may not be correct or correctable due to inherently incorrigible physical flaws.

Figure 4:
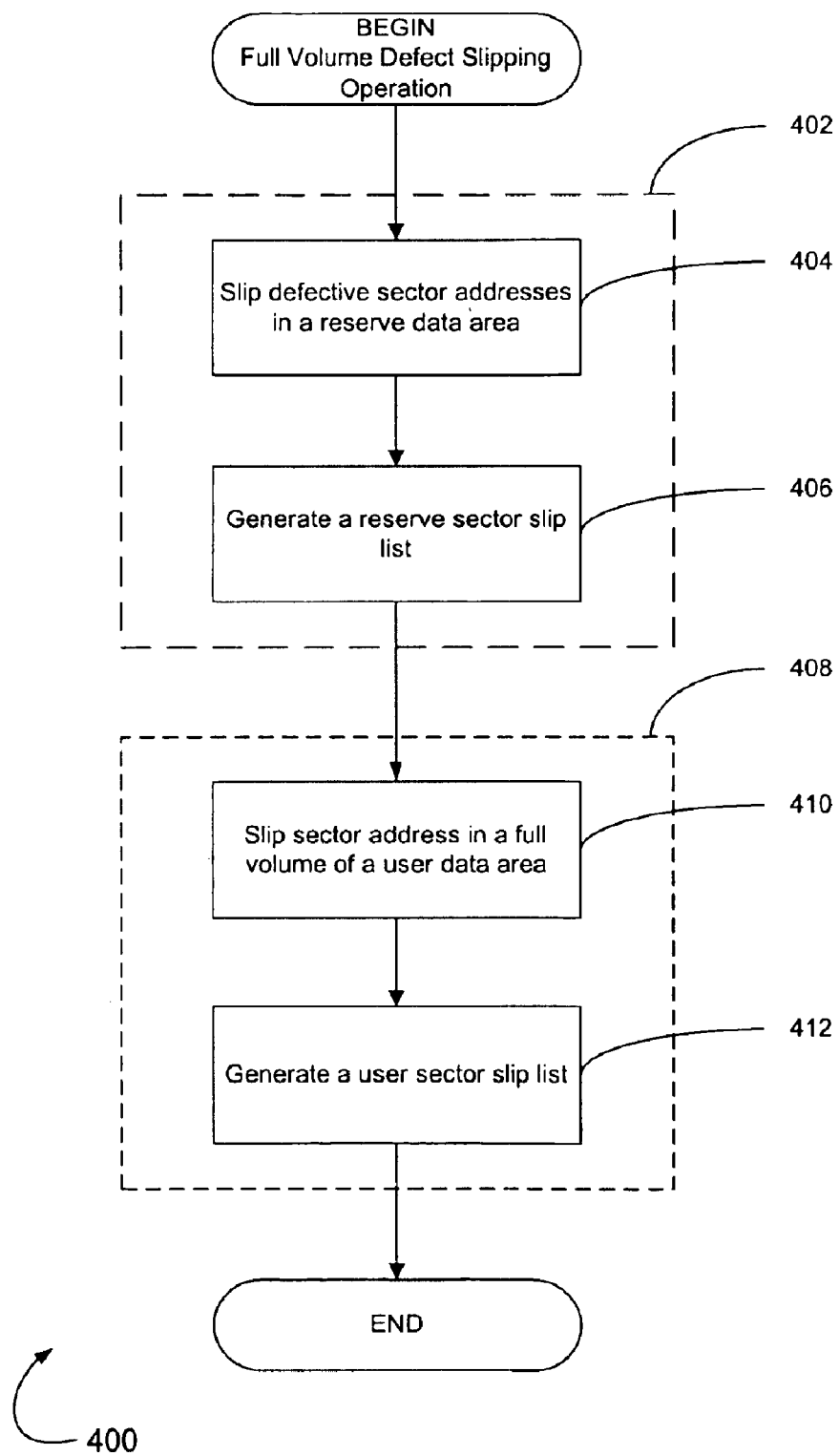
FIG. 4 is a full volume slip defect slipping flowchart in accordance with a preferred embodiment of the invention.

FIG. 4 is an overview of full volume defect management scheme in a disc drive in accordance with a preferred embodiment of the invention that maps out these defective sectors. According to this preferred embodiment of the invention, the full volume defect slipping technique maintains a pool of spare sectors at the end of a data storage area. Generally, the data storage area in a disc drive of the present invention is made up of a user data area of sectors (hereinafter "user sectors") and a reserve data area of sectors (hereinafter "reserve sectors"). The user sectors are used to store and retrieve information by a controller such as a CPU in a host computer 140, and the reserve sectors are used store and retrieve information required for the disc drive controller 142 to manage and control the storage and retrieval of information in the disc drive 100.

Figure 6:
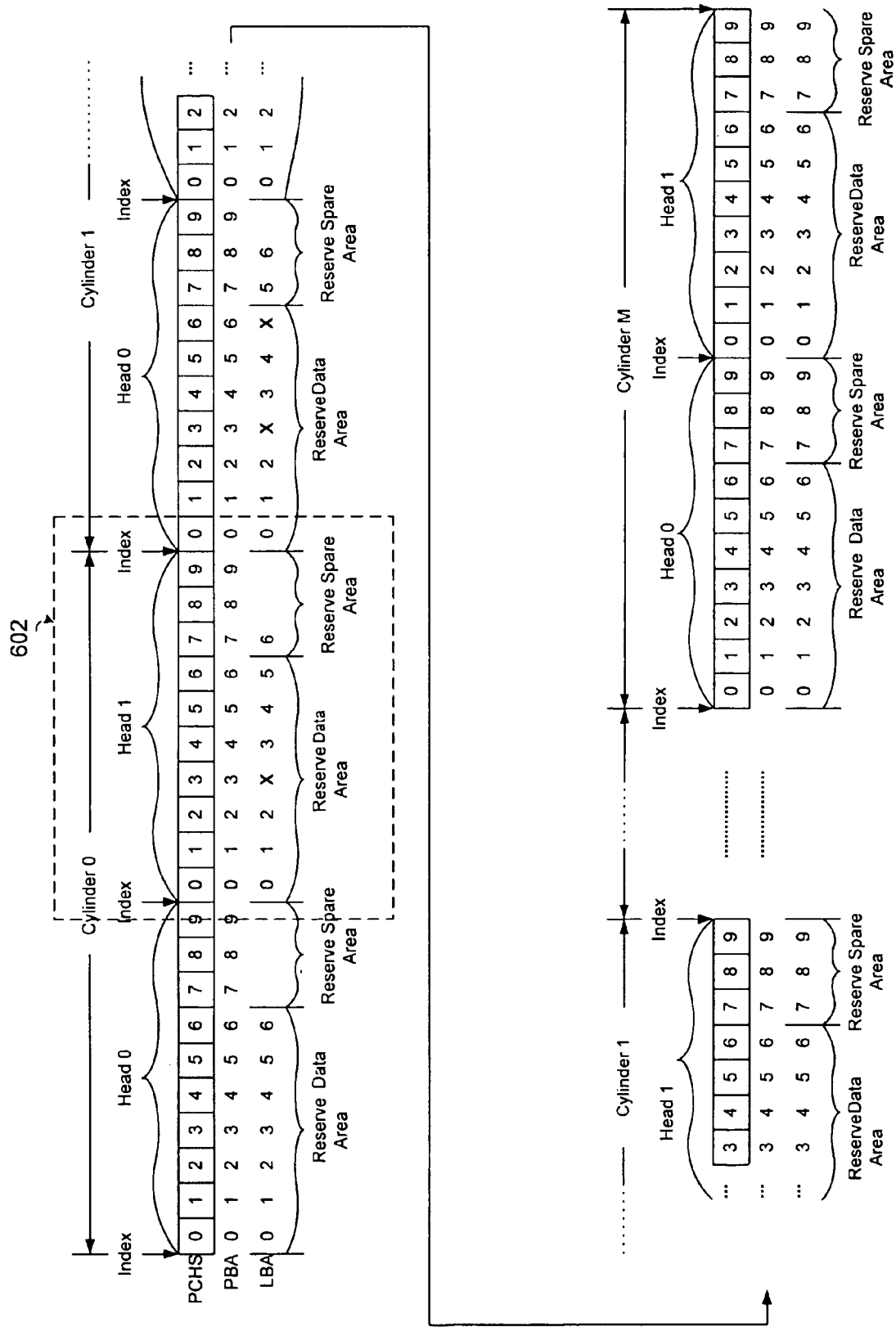
FIG. 6 is a simplified representation showing the organization of sectors in a reserve data area in accordance with a preferred embodiment of the invention.

The full volume defect slipping operation 400 according to the present invention basically includes a reserve sector slipping operation 402 and a user sector slipping operation 408. Defective reserve sectors are "mapped out" in the sector slipping operation 404 in the reserve data area, and a reserve sector slip list is generated in the operation 406. Defective user sectors are mapped out in the full volume sector slipping operation 410 in the user data area, and a user sector slip list is generated in operation 412. To more fully illustrate this, reference is now made to FIG. 6. FIG. 6 generally illustrates the organization of reserve sectors in the reserve data area. According to a preferred embodiment of the invention, the reserve tracks typically occupy less than a single zone and are preferably located in the middle region of the disc surface. The middle of the disc surface is preferred for locating the reserve data area, because the positions of the read element and the write element on each head 118 suspended on an actuator arm 114 coincide with the arc of the track. This arrangement avoids a seek time delay when reading and writing sectors in the same reserve track. The reserve tracks 310 and sectors 312 on a disc 108 are contiguous so that the data are not fragmented, but this is not a requirement. Reserve tracks store multiple copies of information that the controller 142 needs for handling defective sectors on the discs 108. This adds redundancy of information as a security feature in case the reserve sectors storing one copy of information become corrupted or defective. Further, the reserve tracks provide good sectors to redirect data that was supposedly to be stored in a defective user sector identifies in the user data area as will be subsequently explained.

Typically, twenty spare sectors are allocated at the end of each reserve track as reserve spare sectors, but each track can have a different number of spare sectors. In an exemplary preferred embodiment of the invention, one disc with two heads (ten sectors per track or head) is present in a disc drive, and each track in the reserve data area is allocated with seven reserve data sectors at the beginning of the track and with three reserve spare sectors at the end of the track as illustrated in FIG. 6. The sector slipping operation 402 is performed at a track level. That is, the logical address (LBA) for a defective reserve sector is slipped to a next good reserve sector on the reserve track. As illustrated in FIG. 6, the bad sector (X) located at PBA 3 on the reserve track 602 is slipped to the next closest available good reserve sector, PBA 4. That is, the data that would have been stored in PBA 3 is stored in PBA 4 instead. To a disc drive controller 142, the good reserve sector represented by PBA 4 effectively becomes the original target sector of PBA 3. That is, PBA 4 is assigned a logical address originally intended for PBA 3, had PBA 3 not been a defective sector. The first spare sector located at the end of the reserve track 602 (that is, the sector having PCHS 017 and PBA 7) then makes up for the loss of sector PBA 3, and so maintains the sequential order of data.

Figure 5:
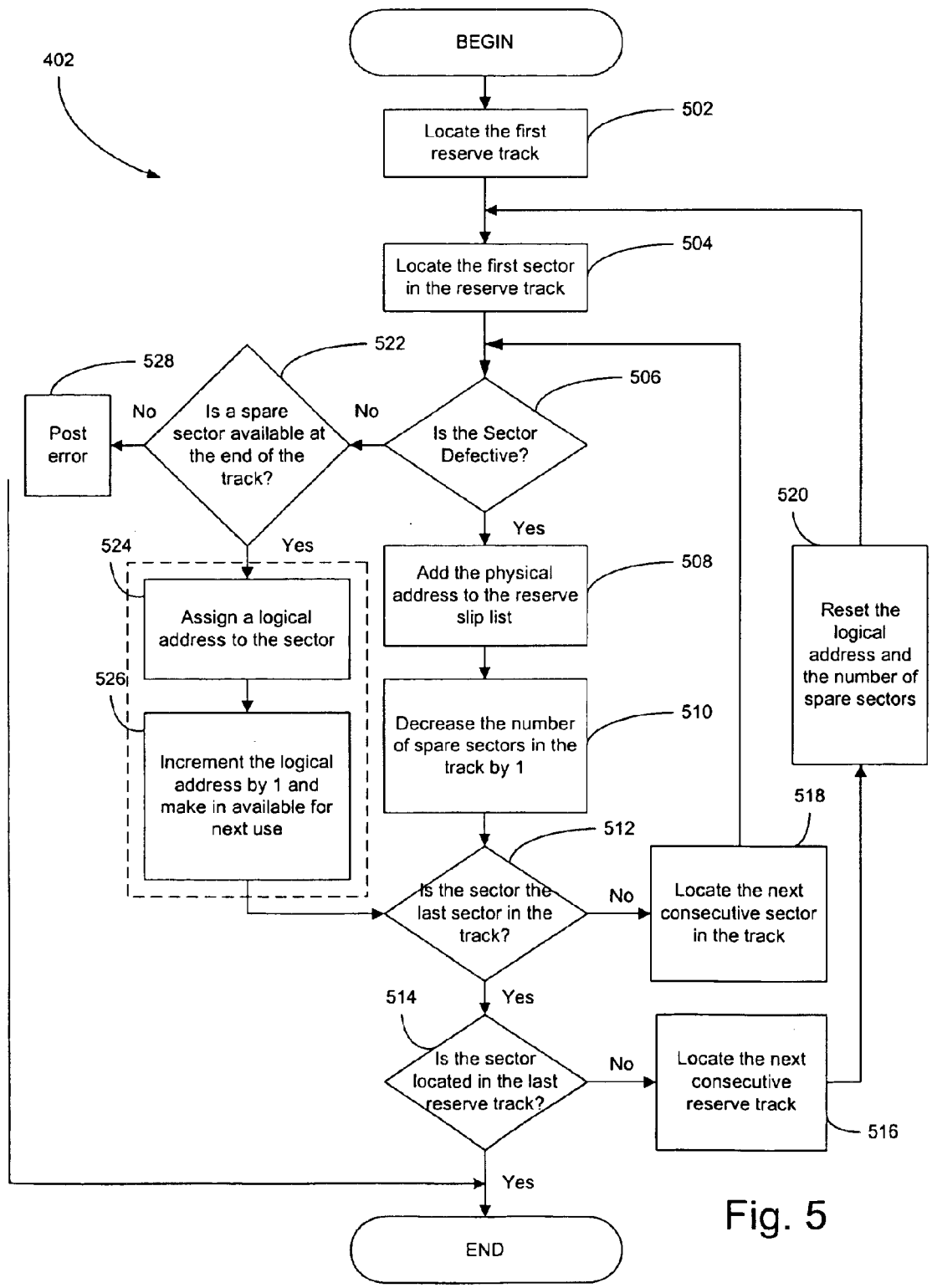
FIG. 5 is a reserve data area defect slipping flowchart in accordance with a preferred embodiment of the invention.

FIG. 5 is a flowchart illustrating the reserve sector slipping operation 402 according to a preferred embodiment of the present invention. The reserve data area organization resulting from the operation 402 is generally illustrated in FIG. 6. Control begins in operation 502. The track locating operation 502 identifies the first reserve track in the disc drive 100. Note that a cylinder is essentially a set of tracks at the same radius in a multiple head disc drive system. Thus a "track" in this example may be considered to be the same as a "cylinder," and thus what is applicable to a reserve track may also be applicable to a reserve cylinder. Control then transfers to the sector locating operation 504 that identifies the first sector in the reserve track. The first reserve sector is then tested for any defect in the defect identifying query operation 506.

In the query operation 506, an error correction coding subprogram may be run to try to correct the sector; however, if such an attempt fails, this reserve sector is considered as a defective sector. The PCHS of this defective sector is then added to a reserve sector slip list in operation 508. Control then transfers to operation 510. In operation 510, the number of available spare sectors in the reserve track is decreased by one to account for slipping. Control then transfers to query operation 512. This operation queries whether the reserve sector just tested is the last reserve sector in the reserve track. If not, the next consecutive reserve sector is located in operation 518 and control returns to operation 506 where the next reserve sector is tested for any defect. If, in operation 506, the sector is not found to be defective, the number of available reserve spare sectors at the end of the track is checked in the operation 522. If there is no reserve spare sector remaining, the sector slipping operation 402 ends and an error is posted in operation 528. If, however, a reserve spare sector is available at the end of the reserve track control transfers to operation 524. The operation 524 assigns a LBA to the good sector. Control then transfers to operation 526 where the count of LBAs for the reserve track is then incremented by one. Control then returns to query operation 512. The sector slipping operation 402 continues until the last reserve sector in the last reserve track has been tested for a defect as in the operations 512, 514, 516, 518, and 520 as shown in FIG. 5. It is noted that the assigning LBAs to reserve sectors in operations 524 and 526 maybe optional, because the disc drive controller 142 may access the reserve sectors by their physical address (i.e., PCHSs and/or PBAs) only. That is, the disc drive controller 142 may access or control access to a reserve sector in the reserve data area simply using the reserve sector slip list generated in the operation 508.

The user sector slipping operation 408 is illustrated in FIGS. 7, 8, 9, 10-1, 10-2, 10-3, 10-4, and 10-5. Whereas reserve sectors are slipped on a per track basis as above described, the user sectors are slipped over the full volume of a user data area. That is, a pool of user spare sectors is maintained at the end of the user data area.

Figure 8:
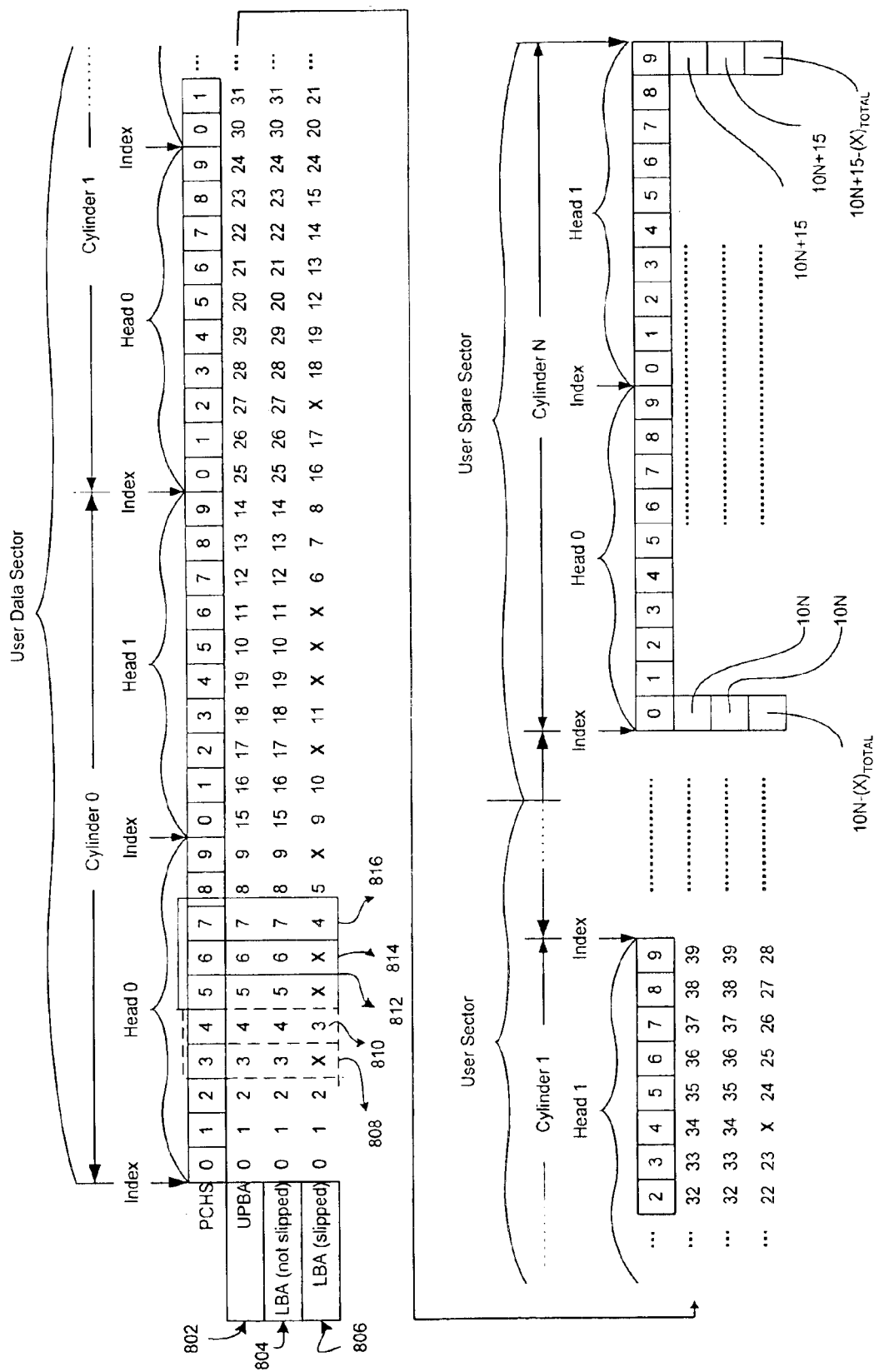
FIG. 8 is a simplified representation showing the organization of sectors in a user data area in accordance with a preferred embodiment of the invention.

FIG. 8 generally illustrates the organization of user sectors in an exemplary preferred embodiment of the present invention. The disc drive in this exemplary illustrated preferred embodiment has of a single disc, two heads, and ten sectors per head or track. The user data area of the exemplary preferred embodiment is made up of N cylinders of user sectors divided into user data sectors and the user spare sectors. The user spare sectors are all located at the end of the user data area and consecutively follow the user data sectors. That is, no spare sectors are set aside at the end of each track or cylinder within the user data area.

Every user sector is assigned a PCHS and a User Physical Block Address (UPBA) 802. The UPBAs 802 are consecutively numbered addresses starting from the first user sector (e.g., the sector having the PCHS of 000 in FIG. 8) to the last user sector (e.g., the sector having the PCHS of N19 in FIG. 8). It is noted that a UPBA is used to represent a PBA of a user sector in the user data area; thus, what is applicable to a PBA is also applicable to a UPBA (and vice versa) in the exemplary preferred embodiment. The user data sectors are used by the host computer 140 to store data; therefore, the total number of UPBAs 802 representing the user data sectors equals the total number of LBAs. Thus, if there are no defective sectors in the user data area, every user data sector in the user data area is assigned a LBA that is typically identical to the UPBA as shown in the row of UPBA 802 and the row of LBA (not slipped) 804.

The LBA assigned to each user data sector if all user sectors are good sectors is hereinafter referred to as a "LBA (not slipped)" 804. That is, a LBA (not slipped) of a user data sector always equals the UPBA of the user data sector, only if no user data sectors have been slipped. On the other hand, if there are defective sectors in the user data area, the LBA (not slipped) 804 of each defective sector is then slipped to the next available good user sector, and thus the sequential order of data is maintained. Good user spare sectors located at the end of the user data area then make up for the loss of defective user data sectors. In this light, the LBA (not slipped) of defective sectors are slipped over the full volume of the user data area. That is, the LBA consecutively following the LBA of the last good user data sector is then assigned to the first good user spare sector. Each of the LBAs corresponding to the subsequent user spare sectors is slipped sequentially to the next good user spare sector. The total number of LBAs equals the total number of user data sectors. That is, the LBA (not slipped) corresponding to the last user data sector is the last LBA slipped to a user spare sector. For example, the LBA (not slipped) 3 corresponds to a defective sector 808 with UPBA 3 or PCHS 003. Since UPBA 3 is a defective sector, the LBA (not slipped) 3 is slipped to the next available good user sector, which is UPBA 4. Thus, LBA 3 is assigned to UPBA 4. LBA (not slipped) 4 is then slipped to the next available good user sector, which is UPBA 7. Similarly, the LBAs (not slipped) 5, 6, and 7 are also slipped to next available good user sectors UPBAs 8, 12, 13 respectively and thus maintain the sequential order of LBAs. The defective sectors, UPBAs 3, 5, and 6, are not assigned LBAs. Therefore, if a host computer 140 sends a command to the disc drive controller to 142 access LBA 3, the disc drive controller 142 would then map the LBA 3 to UPBA 4 and translate the UPBA 4 to PCHS 004 in order that an appropriate head on an actuator assembly 110 can access the sector PCHS 004.

Figure 7:
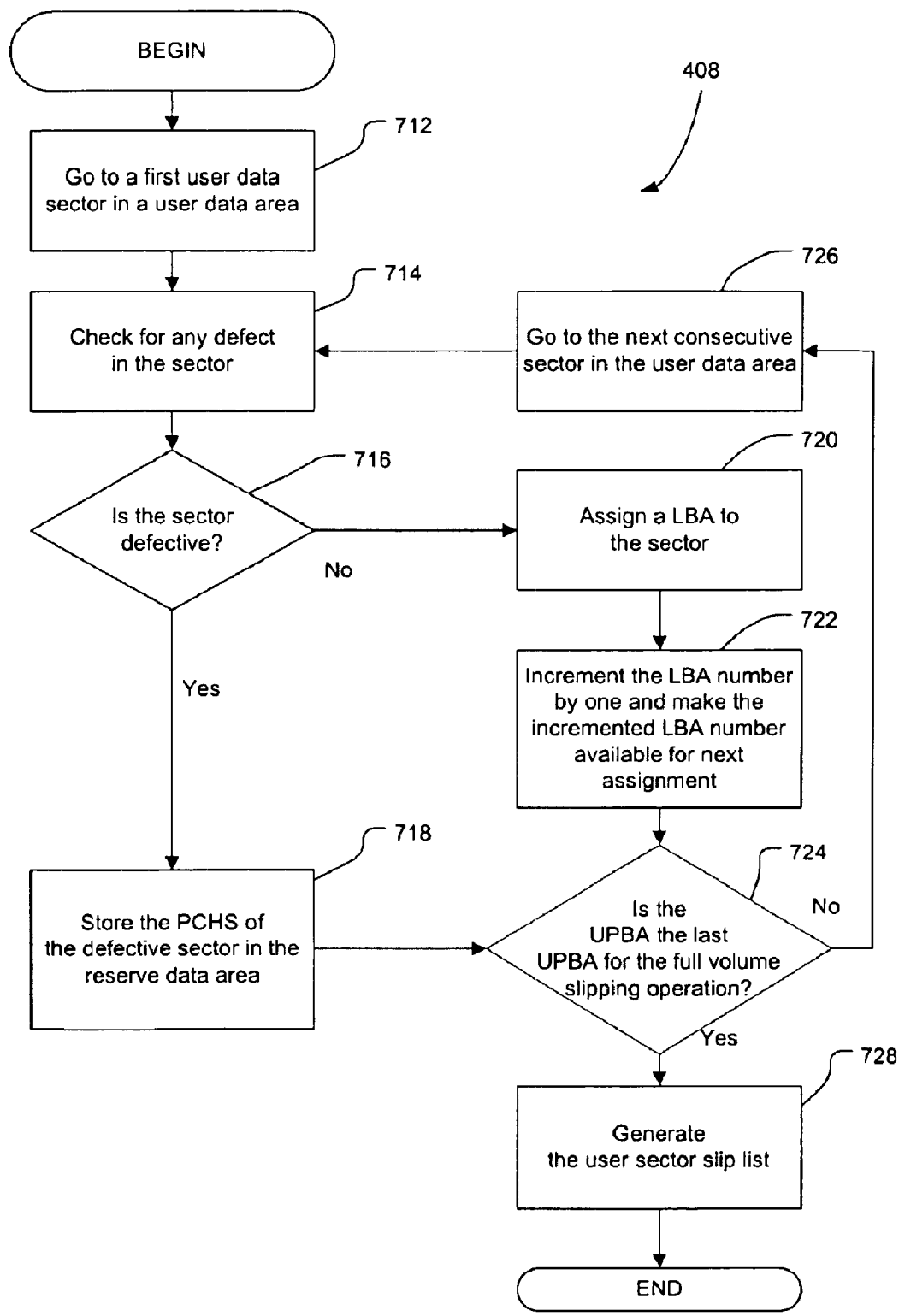
FIG. 7 is a user data area defect slipping flowchart in accordance with a preferred embodiment of the invention.

Such a mapping operation or slipping operation of LBAs over the full volume of the user data area is generally illustrated in FIG. 7, which is a flowchart of the user sector slipping operation 408 according to an exemplary preferred embodiment of the present invention. The sector locating operation 712 identifies the first user data sector in a disc drive 100. According to the exemplary preferred embodiment, the first user data sector is a user data sector having the smallest PCHS or the smallest UPBA; however, starting at the smallest physical address number is not a requirement. Instead, the first user sector may be chosen based on, for example, the contiguity of sectors or fragmentation of data so as to minimize the latency and/or seek time delays. After identifying the first user data sector, the sector is checked for any defect in operation 714. Control transfers to query operation 716. In this query operation 716, an error correction program may be called and run to correct the sector; however, if such an attempt fails, the identified sector is considered to be a defective sector. The PCHS of the defective sector is then stored in the reserve data area in the operation 718. If, however, the identified sector is not found to be defective in the operation 716, control transfers to operation 720. A LBA is assigned to the identified sector in the operation 720.

Once a LBA is assigned to a user sector, the disc drive controller 142 is able to map the LBA to the UPBA using the user sector slip list upon an access command from the host computer 140, and then translate the UPBA into a PCHS so that the actuator assembly 140 can seek to the sector 312. The user sector slip list is generated, inter alia, using the PCHSs of defective sectors stored in the reserve data area in operation 718. Thereafter, the LBA number is incremented by one in operation 722 and is made available for the next assignment in the operation 720 by, for example, storing the incremented LBA number in a memory queue. Thus sequential number of LBAs are assigned to good user sectors, and such a data organization is generally illustrated in FIG. 8. The forgoing operations 714, 718, 720, and 722 continue until the last LBA (that is, the LBA (not slipped) of the last user data sector) is slipped to a good user sector in operation 724. If there were no defective user sectors, the last LBA is assigned to the last user data sector, and no user spare sectors are needed. If there are a number of defective user sectors, then that same number of good user spare sectors is required to slip LBAs. Once every good user sectors is assigned a LBA through the sequences of operations 714 through 726, the user sector slip list is generated in operation 728.

Figure 9:
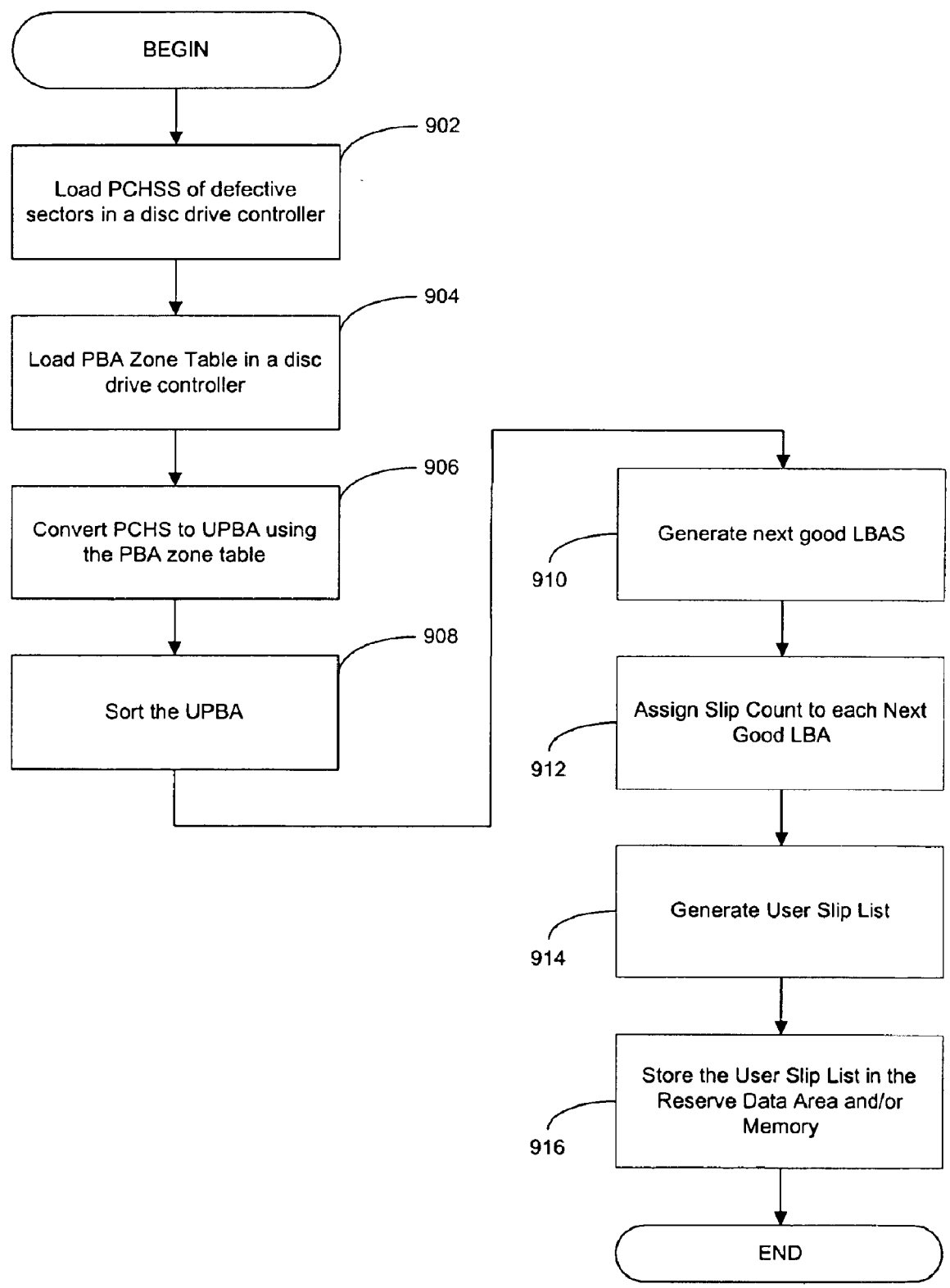
FIG. 9 is a user sector slip list flowchart in accordance with a preferred embodiment of the invention.

The user sector slip list generating operation 728 is generally illustrated in a flowchart shown in FIG. 9. An example of a user sector slip list according to the exemplary preferred embodiment is shown in FIG. 10-4. Shown in FIGS. 10-1, 10-2, and 10-3 are tables generally illustrating an example of data components as the user sector slip list of FIG. 10-4 is generated. Additionally, FIG. 10-5 is a PBA Zone Table according to the exemplary preferred embodiment of the present invention. The PBA Zone Table contains the data organization information of the disc drive and is generated during each power up of the disc drive system. Once the PBA Zone Table is generated, it is stored, for example, in the memory of a disc drive controller; however, this is not a requirement (that is, the PBA Zone Table may be alternatively stored on disc in the reserve data area). The PBA Zone Table according to the preferred embodiment contains the information regarding data storage organization of a disc drive, such as, PBA to zone assignment table 1052, head skew 1053, cylinder or track skew 1054, sectors per head 1055, and heads per cylinder 1056, among others. Upon a command from a host computer 140 to access a sector with a LBA, the disc drive controller 142 maps the LBA to a UPBA or PBA. Thereafter, the disc drive controller 142 uses the PBA Zone Table, among others, to translate the UPBA or PBA into a PCHS.

As generally illustrated in the operation 718 (FIG. 7), PCHSs of all defective user sectors are stored in the reserve data area in multiple copies for redundancy. Now referring again to FIG. 9, generation of the user slip list (operation 728) will be more fully described. In operation 902, the PCHSs of the defective user sectors are loaded in a disc drive controller 142 from the reserve data area. In addition, the PBA Zone Table as shown in FIG. 10-5 is also loaded from the reserve data area (or from other memory) in operation 904. Each PCHS of a defective user sector is then converted to a UPBA by using the PBA Zone Table in operation 906.

The disc drive performs the following operations to convert a PCHS to a UPBA using the PBA Zone Table:

(1) Determine the UPBAs that are in the cylinder wherein the target PCHS is located;

(2) Determine the UPBAs in the head, which head is located within the cylinder wherein the target PCHS is located; and (3) Determine the UPBA of the target PCHS.

For example, PCHS 003 or UPBA 3 is a defective sector as shown in FIG. 8. PCHS 003 indicates that the sector is located in cylinder 0, head 0, and sector 3. Knowing that PCHS 003 is in cylinder 0, the disc drive controller first determines all UPBAs that are in cylinder 0 using the PBA Zone Table. In order to do this, the disc drive controller determines the zone in which the cylinder 0 is located by using the PBA Zone Table. According to the PBA to zone assignment table 1052, the disc drive controller determines that UPBAs 0 to 99 are in zone 0 according to the exemplary preferred embodiment. Further, the disc drive controller determines from the PBA Zone Table that there are ten sectors per head 1055 and two heads per cylinder 1056. Knowing such information from the PBA Zone Table, the disc drive controller computes that there are twenty sectors per cylinder according to the exemplary preferred embodiment. Knowing that there are twenty sectors per cylinder, the disc drive controller also computes that there are four cylinders in zone 0. Then, it is easily computed UPBAs 0–19 are in cylinder 0 in zone 0. The disc drive controller then determines on which head of cylinder 0 the PCHS 003 is located. Knowing that PCHS 003 is on head 0 of the two heads in the cylinder 1056 wherein there are ten sectors per head 1055, the disc drive controller determines that head 0 corresponds to the first half of the twenty determined UPBAs (that is, UPBAs 0–9). Knowing that PCHS 003 is in cylinder 0 head 0 and knowing that UPBAs 0–9 are in cylinder 0 head 0, the disc drive controller then determines that PCHS 003 corresponds to UPBA 3 since PCHS 003 indicates the fourth sector offset in cylinder 0 head 0. Thus, PCHS 003 is converted into UPBA 3 using the PBA Zone Table.

For another example, PCHS 012 or UPBA 17 is a defective sector as shown in FIG. 8. PCHS 012 indicates that the sector is located in cylinder 0, head 0, and sector 3. Knowing that PCHS 012 is in cylinder 0, the disc drive controller first determines all UPBAs that are in cylinder 0 using the PBA Zone Table. As shown in the example above, the disc drive controller determines that cylinder 0 is in zone 0 and that UPBAs 0–19 are in cylinder 0 in zone 0. The disc drive controller then determines on which head of cylinder 0 the PCHS 012 is located. Knowing that PCHS 012 is on head 1 of the two heads in the cylinder 1056 wherein there are ten sectors per head 1055, the disc drive controller determines that head 1 corresponds to the second half of the twenty determined UPBAs (that is, UPBAs 10–19). Knowing that PCHS 012 is in cylinder 0 head 1 and knowing that UPBAs 10–19 are in cylinder 0 head 1, the disc drive controller then initially determines that PCHS 012 corresponds to the third sector offset in cylinder 0 head 1, that is UPBA 12. However, head skew of five 1053 must be adjusted since PCHS 012 is on head 1. For head 1, there are five-sector offset, and there five sectors are added to UPBA 12. Thus, PCHS 012 is converted into UPBA 17 using the PBA Zone Table. In the preferred embodiment, the head skew is five for a head of ten sectors. Thus, in the preferred exemplary embodiment, there is no sector offset for all even numbered heads, but there is a five-sector offset for all odd numbered heads. Similar logic applies to different head skews, and the disc drive controller is programmed to take each different head skew number into consideration in determining a UPBA from a PCHS.

In addition to the head skew information, the disc drive controller takes into consideration of other information in the PBA Zone Table (such as cylinder skew, cylinder skip, zone density, etc.) in converting a PCHS to a UPBA. Same concept applies that the disc drive controller is programmed to take those additional information in the PBA Zone Table into consideration in converting a PCHS to a UPBA in the similar manner as described in the above example involving a head skew. Additionally, the PCHS to UPBA conversion is described with respect to user sectors in the examples above, but the same or similar concepts and operations applies to reserve sectors.

Therefore, shown in FIG. 10-1 is a table of converted UPBAs of PCHSs in cylinder 0 of the exemplary preferred embodiment. The order of the UPBAs in the table does not follow the sequential order of the PCHSs; for example, UPBA 10 does not consecutively follow UPBA 9. This out-of-order sequence in the exemplary preferred embodiment is caused mainly due to the head skew. However, other parameters such as cylinder skew, cylinder skip, zone density, etc. would produce the same or similar effect. The physical address PCHS symbolizes the physical closeness or geometry of sectors, whereas the physical block address UPBA indicates the order in which the head will access the sectors. Therefore, the PCHS to UPBA table of FIG. 10-1 is sorted according to the ascending order of the UPBAs in operation 908, and the sorted table in ascending order of UPBA is shown in FIG. 10-2.

Thereafter, a Next Good LBA list is generated in operation 910, and the assignment of each Next Good LBA to every defective user sector in cylinder 0 shown in FIG. 10-3. Generally, a Next Good LBA corresponding to a defective user sector is a LBA assigned to the next available good sector following the defective sector in the user data area. One main reason why a Next Good LBA is determined for each defective user sector is that a defective user sector is not assigned a LBA. For example, the first occurring defective user sector in FIG. 10-3 is UPBA 3. If UPBA 3 were not a defective sector, LBA (not slipped) 3 would have been assigned to the UPBA 3. However, as shown in FIG. 8, LBA (not slipped) 3 is slipped to the next available good user sector UPBA 4, because UPBA 3 is a defective sector. As a result, the defective sector UPBA 3 is not assigned a LBA, but the good sector UPBA 4 is assigned LBA 3. Since UPBA 4 is the next good sector contiguously closest to UPBA 3, a Next Good LBA of 3 is assigned to UPBA 3 in the operation 910. The mapping to UPBA 3 to Next Good LBA 3 is shown in FIG. 10-3. It is noted that the UPBA and the Next Good LBA of a first defective user sector is identical, because no slipping ever occurred prior to the first defective user sector.

Similarly, the subsequent defective sector UPBA 5 is not assigned a LBA. It can be computed by applying the logic similar to the above example that the Next Good LBA for UPBA 5 is 4. This is true because one good sector UPBA 4 is present between UPBA 3 and UPBA 5. That is, knowing that 4 is the Next Good LBA corresponding to UPBA 3 and that one good sector is present between UPBA 3 and UPBA 5, the Next Good LBA corresponding to UPBA 5 must be one more than the Next Good LBA corresponding to UPBA 3.

Likewise, it can be determined that the Next Good LBA corresponding to UPBA 6 is also 4, the same Next Good LBA corresponding to UPBA 5. The Next Good LBA corresponding to UPBA 6 is same as that of UPBA 5, because no good sector is present between UPBA 5 and UPBA 6.

The operation 910 of determining a Next Good LBA may be characterized in the following formula:

(Next Good $LBA$)$_{SUBSEQUENT}$=(Next Good $LBA$)$_{PRIOR}$+[ABS(UP-$BA_{PRIOR}$-UPBA$_{SUBSEQUENT}$)-1] with (Next Good $LBA$)$_0$= $(UPBA)_0$.

(Next Good LBA)$_0$ is the Next Good LBA corresponding to the first defective sector (UPBA)$_0$ is the UPBA of the first defective sector (Next Good LBA)$_{SUBSEQUENT}$ is the Next Good LBA corresponding to the second defective sector of the two defective sectors listed consecutively in the order of ascending UPBA.

(Next Good LBA)$_{PRIOR}$ is the Next Good LBA corresponding to the first defective sector of the two defective sectors listed consecutively in the order of ascending UPBA.

ABS (UPBA$_{PRIOR}$-UPBA$_{SUBSEQUENT}$) is the absolute value of the difference between UPBA$_{PRIOR}$ and UPBA$_{SUBSEQUENT}$.

By applying the formula above, the list of Next Good LBAs such as that in FIG. 10-3 can be generated. Since the UPBA and the Next Good LBA of a first defective user sector is identical, the Next Good LBA corresponding to the first defective sector is determined (i.e., (Next Good LBA)$_0$= (UPBA)$_0$=3). For further illustration, two entries in the FIG. 10-3 are sampled as are shown in Table 1:

TABLE 1

| PCHS | UPBA | Next Good LBA |
|---|---|---|
| 006 | 6 | 4 |
| 009 | 9 | 6 |

Using the formula above, it is determined that:
UPBA$_{SUBSEQUENT}$=9;
UPBA$_{PRIOR}$=6; and
(Next Good LBA)$_{PRIOR}$=4.
Thus, the (Next Good LBA)$_{SUBSEQUENT}$ of 6 is computed (that is, 4+[ABS (6−9)−1]=6) as shown in Table 1.

After a list of Next Good LBAs is generated, control transfers to operation 912. A Slip Count is assigned to each Next Good LBA in operation 912. The list of Slip Counts corresponding to defective sectors in cylinder 0 of the exemplary preferred embodiment is shown in FIG. 10-4. The Slip Count is an integer value sequentially assigned to each Next Good LBA in the ascending order of UPBA. For example, since Next Good LBA 3 assigned to UPBA 3 that is the first on the list, Next Good LBA 3 is assigned a Slip Count of 1. Similarly, Slip Count 2 is assigned to Next Good LBA 4 that corresponds to UPBA 5, because UPBA 5 is the second on the list. Likewise, Slip Count 5 is assigned to Next Good LBA 6 that corresponds to UPBA 10, because UPBA 10 is the fifth on the list. Control then transfers to operation 914. Generating Slip Counts and assigning each of them to a corresponding Next Good LBA completes the generating a user sector slip list operation 914. The user sector slip list, such as is shown in FIG. 10-4, identifies, inter alia, all defective sectors in the disc drive 100 and the slipped LBA of the defective sectors. Control then transfers to operation 916 where the user slip list is stored for further use in the Reserve Data area or disc memory 143. The disc drive controller 142 then uses the user sector slip list compiled in operation 914 to convert, among others, LBAs to PBAs or UPBAs and to corresponding PCHSs. The conversion operation of sector addresses using the user sector slip list such that of FIG. 10-4 is generally illustrated in a flowchart in FIG. 16 and will be described in more detail below.

Figure 11:
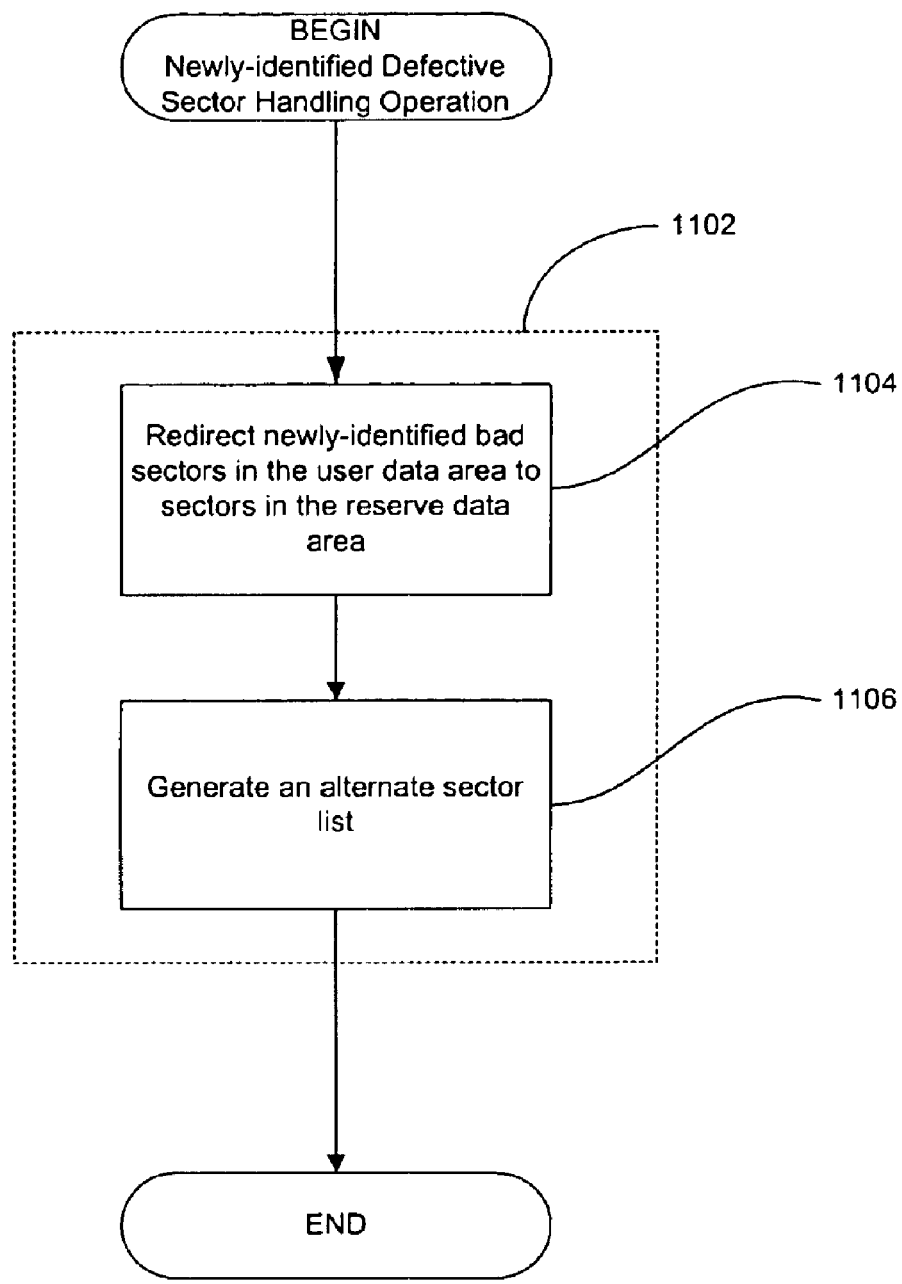
FIG. 11 is a newly-identified defect slipping flowchart in accordance with a preferred embodiment of the invention.

FIG. 11 is a flowchart generally illustrating the handling of "newly-identified" bad sectors in a disc drive 100 according to the exemplary preferred embodiment of the present invention. These bad sectors may arise during drive operation after initial mapping due to discovery of new defects, etc., that may occur.

The newly-identified defective sector handling operation 1102 consists of a newly-identified sector redirecting operation 1104 and an alternate sector list generating operation 1106. A newly-identified defective sector may be a sector that used to be a good sector but became a defective sector while the disc drive is in operation. For example, all defective sectors in a disc drive may be mapped out initially at the factory so that such defective sectors are transparent to a user. The initial mapping operation may involve, inter alia, the reserve sector slipping operation and the full volume user sector slipping operation. During such slipping operations, the LBAs of defective sectors are slipped to a next available good sector. However, if the next available good sector assigned with a slipped LBA later becomes defective, this newly-identified defective sector cannot repeat the slipping operation, because there is no another next available good sector. Therefore, the LBAs of newly-identified defective sectors may not be slipped again. For this reason, newly-identified defective sectors are redirected to good sectors in the reserve data area in operation 1104. After completing the redirecting operation 1104, an alternate sector list is generated in operation 1106. The alternate sector list generally contains mapping information, among others, between a redirected LBA and a PCHS of the reserve sector of data, so that a host controller and a disc controller may access the data stored therein.

Figure 12:
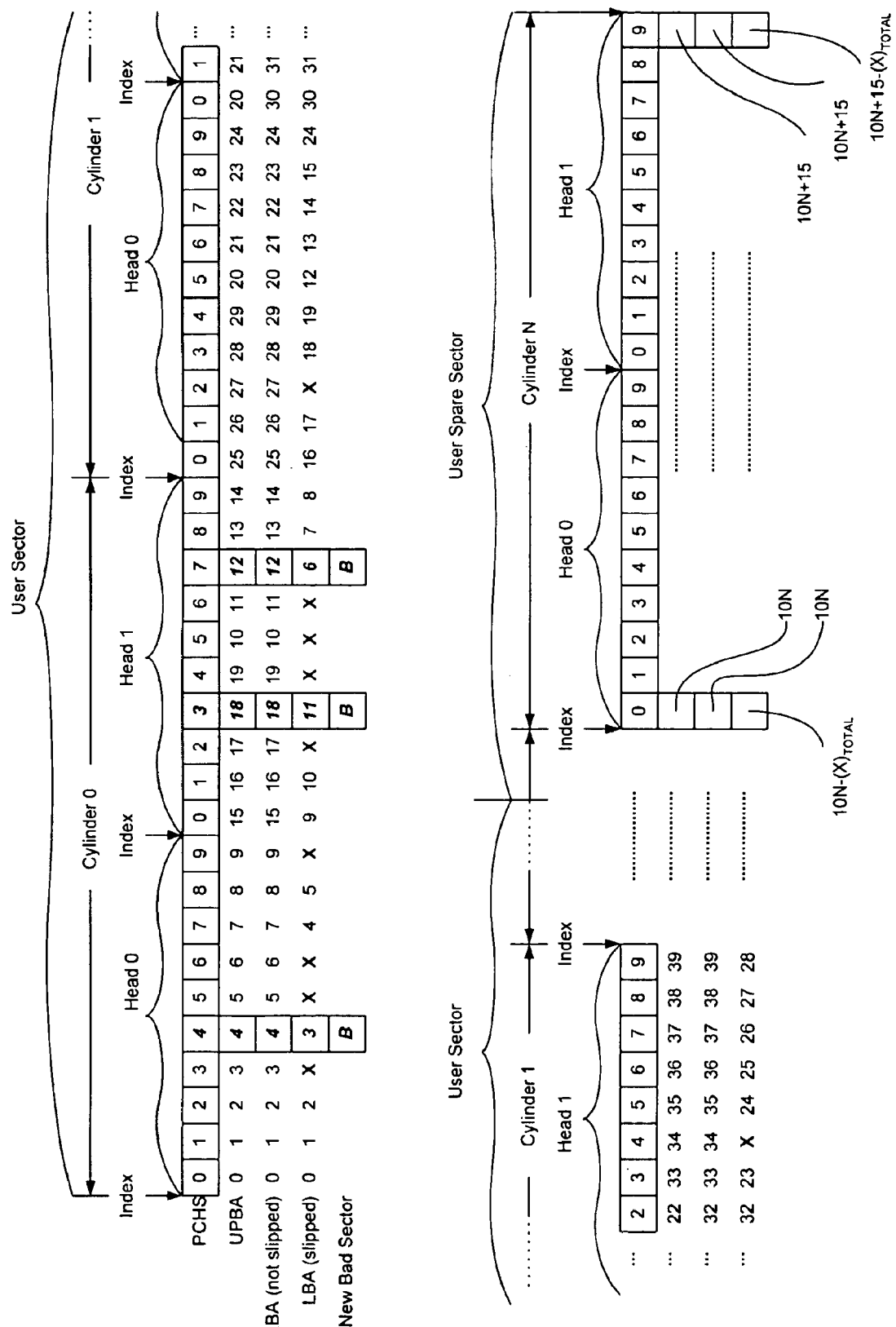
FIG. 12 is a simplified representation showing the organization of sectors in a user area with alternated defective sectors in accordance with a preferred embodiment of the invention.

Shown in FIG. 12 are three newly-identified defective sectors in the exemplary preferred embodiment; they are UPBAs 4, 12, and 18 located in cylinder 0. UPBA 4 is assigned LBA 3; UPBA 12 is assigned LBA 6; and UPBA 18 is assigned LBA 11. It is noted that the UPBA number and the LBA number for each sector may not be same, mainly for a reason that the LBAs (not slipped) are slipped over the defective sectors. Thus, the slipped LBAs 3, 6, and 11, each corresponding to a defective sector, cannot be slipped again because every subsequent good sector is already assigned a LBA. For example, LBA 3 corresponding to UPBA 4 cannot be slipped again because the next available good sector UPBA 7 is already assigned LBA 5. Likewise, LBA 11 corresponding to UPBA 18 cannot be slipped again because the next available good sector UPBA 12 is already assigned LBA 6. Therefore, each of newly-identified defective sectors such as these is redirected to a available good data sector in the reserve data area. The mapping information between the LBA and the redirected reserve sector PCHS is recorded in the alternate sector list.

Figure 13:
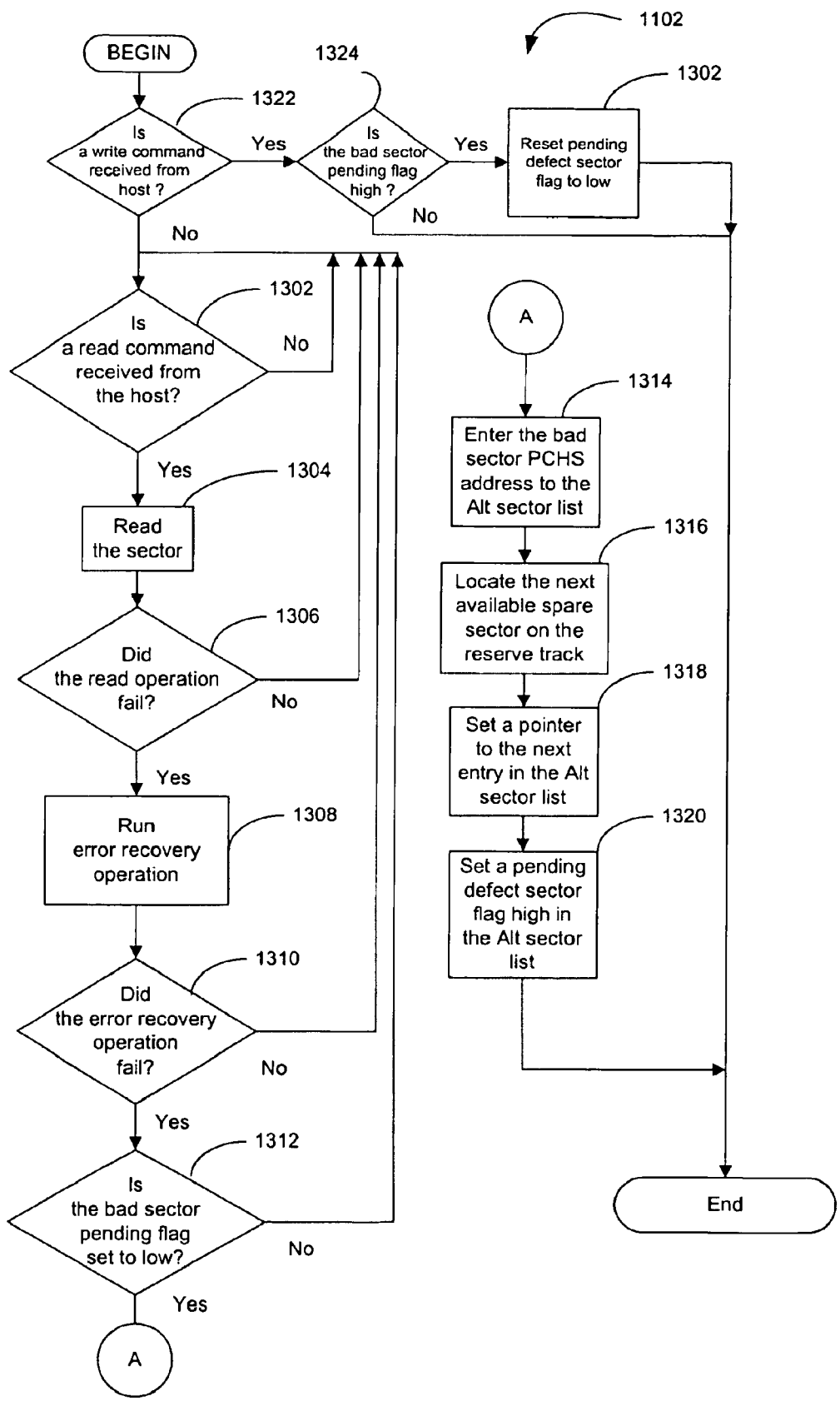
FIG. 13 is a alternate slip list flowchart in accordance with a preferred embodiment of the invention.

FIG. 13 is a flowchart that generally illustrates the newly-identified sector handling operation 1102. A data access command is sent by a host controller and received by a disc drive controller. The data access command may include a read command or a write command, among others. When a read command is received in operation 1302, the disc drive controller attempts to read the target sector in operation 1304 by, for example, converting the LBA into a PCHS using the user sector slip list. If the read attempt fails in operation 1306, an error recovery operation 1308 is then executed. If such an attempt to recover error fails again in operation 1310, the sector is then flagged as a pending defect in operation 1312. The pending defect flag, for example, is a single bit flag in an alternate sector list and indicates that the sector has failed both read attempt and error recovery attempt but no attempt is yet made to write to that sector. Thus, a pending defective sector remains pending as long as a series of read commands is received by the disc controller, and, for this reason, a pending defective sector generally remains pending until a write command is received. Upon receiving a write command, the pending defective sector becomes a newly-identified defective sector, and the pending flag is set to low.

Setting the pending flag to high or low to indicate a defective status is arbitrary and a matter of design choice. In the exemplary preferred embodiment, a low pending defect flag indicates a newly-defective sector and a high pending defect flag indicates a pending defective sector, but the flag magnitude may be reversed to indicate the opposite status.

If the pending defect flag is set to low in operation 1312, the PCHS of the pending defective sector is stored in the reserve data area and also added to the alternate slip list in operation 1314, 1316, 1324, and 1326. On the other hand, if the pending defect flag is set to high in operation 1312, the operation returns to operations 1302 and 1322 and wait for a new command from the host controller. A high pending defect flag indicates that: a sector has failed a read attempt in operation 1306; that the sector has failed an error recovery attempt in operation 1310; that the sector had not yet received a write command in operation 1322; and that the PCHS of the sector is updated in the alternate sector list as in operations 1314, 1316, and 1318. Thus, if a write command is received to write to a pending defective sector as in operations 1322 and 1324, the pending defective flag for that sector is set to low in operation 1326 indicating that the defective sector is no longer pending but is a newly-identified defective sector. The disc drive controller then writes data to a redirected good sector in the reserve data area.

Redirecting the LBA of a newly-identified defective sector to a good reserve data sector involves generating alternate sector list in operations 1314, 1316, and 1318. If an error recovery operation 1308 fails for a target sector that is not yet a pending defective sector (such as operation 1312), the PCHS of the target sector is recorded in the alternate slip list in operation 1314. In operation 1316, an available good reserve sector is located and the location of the reserve sector is recorded in the alternate slip list in association with the target sector. In the exemplary preferred embodiment, a group of good reserve data sectors are set aside as a pool of alternate sectors. Thereafter, a pointer to the next entry in the alternate sector list is recorded in association with the target sector in operation 1318. An example of the alternate slip list according to an exemplary preferred embodiment is shown in FIGS. 17-2 and 17-3. The alternate sector list generally contains mapping information, among others, between the LBA of a newly-identified defective sector and the PCHS of a redirected reserve data sector. The operation of the disc drive controller accessing redirected sectors using the alternate sector list is described in detail with respect to FIGS. 17-1, 17-2, and 17-3 in the application below. The pending flag is then set to high in operation 1320 to indicate that the pending defect status of the sector.

Figure 14:
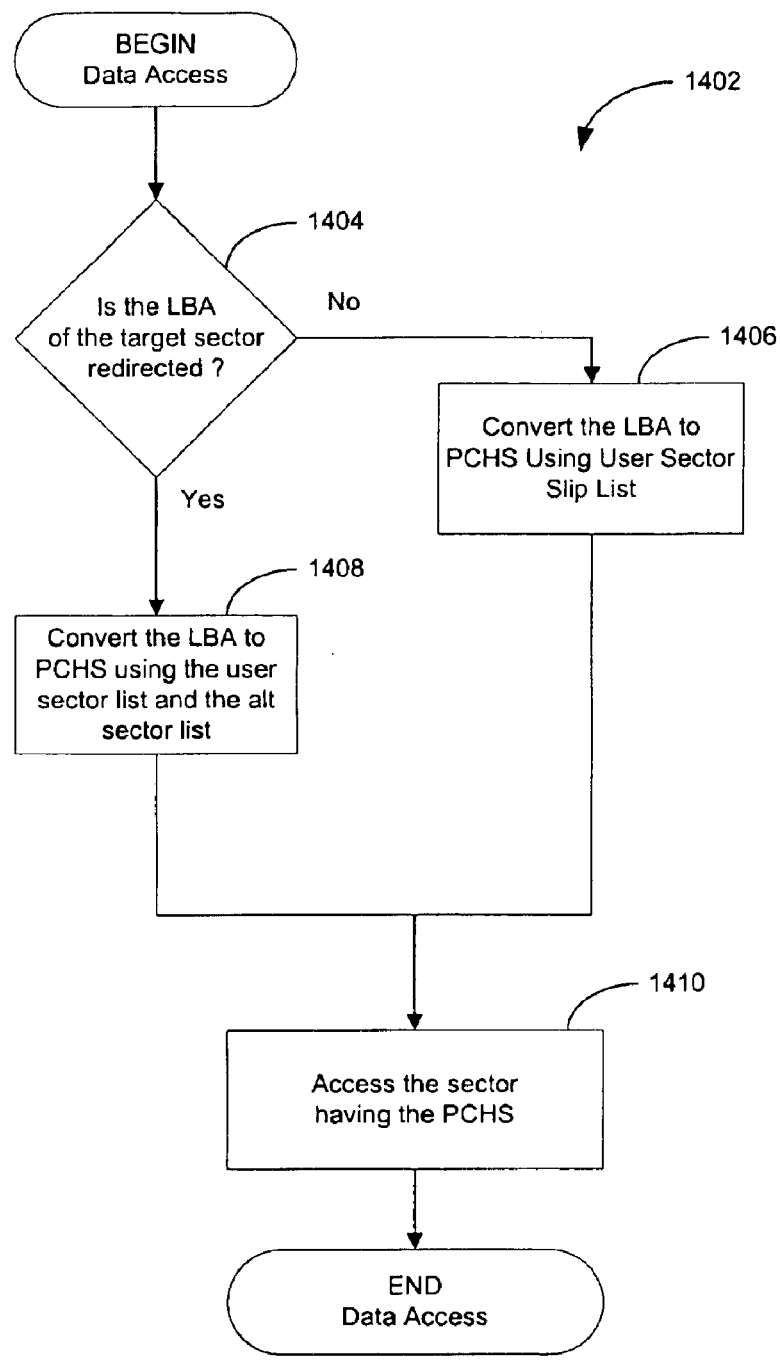
FIG. 14 is a data access flowchart in accordance with a preferred embodiment of the invention.

All defective sectors in the disc drive 100 may be mapped to good sectors in the disc drive by using the defect slipping and redirecting operations described herein. In FIG. 14, is a flowchart generally illustrating operations of accessing data stored in such slipped or redirected sectors. Data access operation 1402 is performed if the LBA of the target sector is slipped or redirected due to a defect in the sector. Operation begins in query operation 1404 where the presence of a redirected LBA exists. If the LBA of the target sector is redirected control transfers to operation 1408 where the disc drive controller 142 converts the LBA into the PCHS of the redirected sector in the reserve data area using the alternate sector list and the user sector slip. Control then transfers to operation 1410. If the LBA of the target sector is not redirected in operation 1404, control transfers to operation 1406 where the disc drive controller 142 converts the LBA into the PCHS of the target sector using the user sector slip list. Control then transfers to operation 1410 where the disc drive controller 142 accesses the data stored in the converted PCHS.

The data access operation 1402 is described in more detail in the flowcharts of FIG. 15-1, 15-2, and 15-3. The disc drive controller 142 waits for a command from a host computer 140 in operation 1502. The command to access data may include, among others, the starting sector LBA and the number of data sectors subsequently following the starting LBA. The starting LBA is then converted into the logical cylinder head sector address (LCHS) in operation 1506, and the LCHS is further converted into the PCHS in operation 1508.

The LBA to LCHS to PCHS conversion operation 1504 is further illustrated in a flowchart in FIG. 16 and discussed below. A LCHS essentially is a physical address of a sector that is not yet adjusted for a head skew and a head serpentine. That is, the LCHS becomes the PCHS after the head skew and the head serpentine is added to the LCHS. In operation 1510, the converted LCHS is checked for validity. It is noted that the PCHS may be used in addition to or instead of the LCHS in operation 1510. Checking validity in operation 1510 concerns more with checking the proper format or structure of the address itself and may not concern with whether the sector corresponding to the address is defective or not. For example, if the converted LCHS is a number that is out of the memory address range or that is not recognizable to the disc controller 142 due to encoding/decoding error, the LCHS is considered as not valid. In such a case, an invalid address error is posted in operation 1518, and the data access operation 1402 ends.

However, if the LCHS is valid, a track defect list for the user data area is generated in operation 1512. The track defect list is generated on every seek operation 1514 and contains PCHSs of all defective sectors on the track or cylinder whereto the actuator arm performs a seek operation. For example, if the starting LBA received by the disc drive controller were LBA 9, the converted PCHS corresponding to LBA 9 is PCHS 010 according to the exemplary preferred embodiment as shown in FIG. 12. Knowing that PCHS 010 is located in cylinder 0 head 1, the actuator arm initiates a seek operation to cylinder 0. While the seek operation is in progress, the disc drive controller 142 generates a track defect list, for example, by loading up the addresses of all defective sectors in the user data area stored in the reserve data area. This operation is possible, because the PCHSs of all defective sectors in the disc drive 100 are stored in the reserve data area during, inter alia, the reserve sector slip operation 402, the user sector slipping operation 408, and newly-identified defective sector handling operation 1102. One of many useful functions provided by the track defect list is that it allows a head to jump to a next good sector if a number of defective sectors is located between two good sectors on a track. This avoids wasted time by not seeking to defective sectors. Once the track defect list is loaded and the seek operation 1514 is initiated, the actuator arm starts following the track in operation 1516.

As the actuator is following the track, the disc controller 142 determines the PCHSs of the target sectors in operation 1522, 1524, 1526, and 1530. In operation 1522, the number of good sectors on each track are calculated the track defect list. For example, now referring to FIG. 12, the number of good sectors on each head can be computed using the track defect list. For example, the number of good sectors on head 0 of cylinder 0 is five; on head 1 of cylinder 0 is four; on head 0 of cylinder 1 is nine, etc. Each head or track has a different number of good sectors due to the full volume sector slipping operation in the user data area as illustrated with respect to FIG. 7. In operation 1524, the disc drive controller determines the number of tracks or heads the target sectors are located on. For example, referring again to FIG. 12, the command received by the disc drive controller may be to access eight sectors of data starting at LBA 9. The disc drive controller then:

(1) converts the starting LBA 9 to PCHS 010 in operation 1504;

(2) determines that the number of sectors that are assigned with LBAs in cylinder 0 head 1 is six and in cylinder 1 head 0 is nine in operation 1522; and therefore (3) determines that two tracks (head 1 in cylinder 0 and head 0 in cylinder 1) must be accesses in order to access the eight sectors of data following LBA 9 in operation 1524. Since more than one heads or tracks need to be accesses in the example above, the starting sector of each head is determined in operation 1526 by incorporating the head skew, the cylinder skew, the head serpentine, and the skip cylinder that are stored in the PBA Zone Table. Then, in operation 1530, the disc drive controller determines the PCHSs in order which they are to be accessed. For example, referring again back to FIG. 12, the sectors in the user data is accessed according the Table 2 in order to access eight sectors of data starting LBA 9:

TABLE 2

| PCHS | UPBA | LBA |
|---|---|---|
| 010 | 15 | 9 |
| 011 | 16 | 10 |
| 013* | 18* | 11* |
| 105 | 20 | 12 |
| 016 | 21 | 13 |
| 017 | 22 | 14 |
| 018 | 23 | 15 |
| 019 | 25 | 16 |
| 100 | 26 | 17 | as a result of operations 1522, 1524, 1526, and 1530, the sequence of accessing PCHSs that corresponds to sequential order of LBAs is determined. That is, PCHS 010 (LBA 9) is accesses the first; PCHS 011 (LBA 10) the second; PCHS 013\* (LBA 11\*) the third, etc. This order of access is determined in most part as a result of the full volume sector slipping operation as shown in FIG. 7 The full volume slipping operation eliminates data fragmentation in the user data area and any latency delay that may incur due to defective sectors. For example, referring again to FIG. 12, a defective sector PCHS 012 is present between LBA 10 (i.e., PCHS 011) and LBA 11 (i,e., PCHS 103) As shown in Table 2, the disc drive controller of the present invention accesses directly to PCS 013 after accessing PCHS 011. Without the full volume sector slipping operation, the head would have to jump after accessing LBA 10 to a different sector located in another part of the disc drive in order to access LBA 11, and this may incur significant latency and seek time delays.

Again referring to FIG. 12, LBA 11\* or PCHS 013\* is a newly-identified defective sector, and, therefore, the data for LBA 11 is redirected and stored in a reserve data sector. This status is determined by examining the redirected slip list in operation 1532 shown in FIG. 15.3. After determining there is a redirected defect LBA in operation 1532, the disc controller 142 determines whether a pending defect is set to high in operations 1534 and 1536. For example, a low pending defect flag indicates that PCHS 013\* is determined defective and that the data for LAB 11\* is redirected to or written in a reserve data sector; nevertheless, a high pending defect flag indicates that PCHS 013\* is determined defective but no data is redirected to a reserve data sector because no write command was received by the disc controller 142. Therefore, if a write command was not received in operation 1537, the data access operation 1402 ends after posting a pending defect error in operation 1546. If, however, a write command was received in operation 1537, control transfers to operations 1538, 1540, and 1542, where the redirected reserve data sector location is determined.

Figures 1, 15:
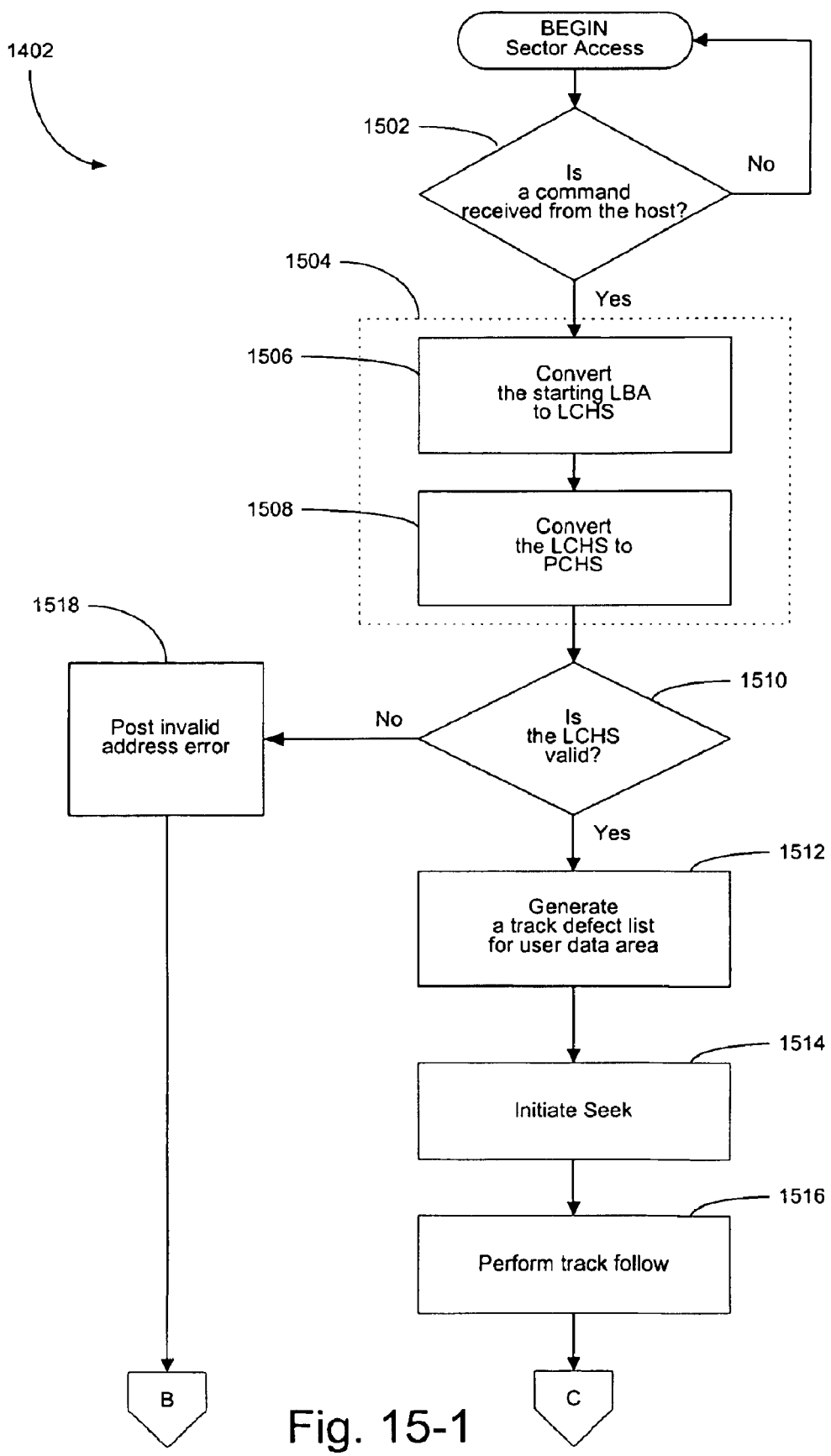
Figures 2, 15:
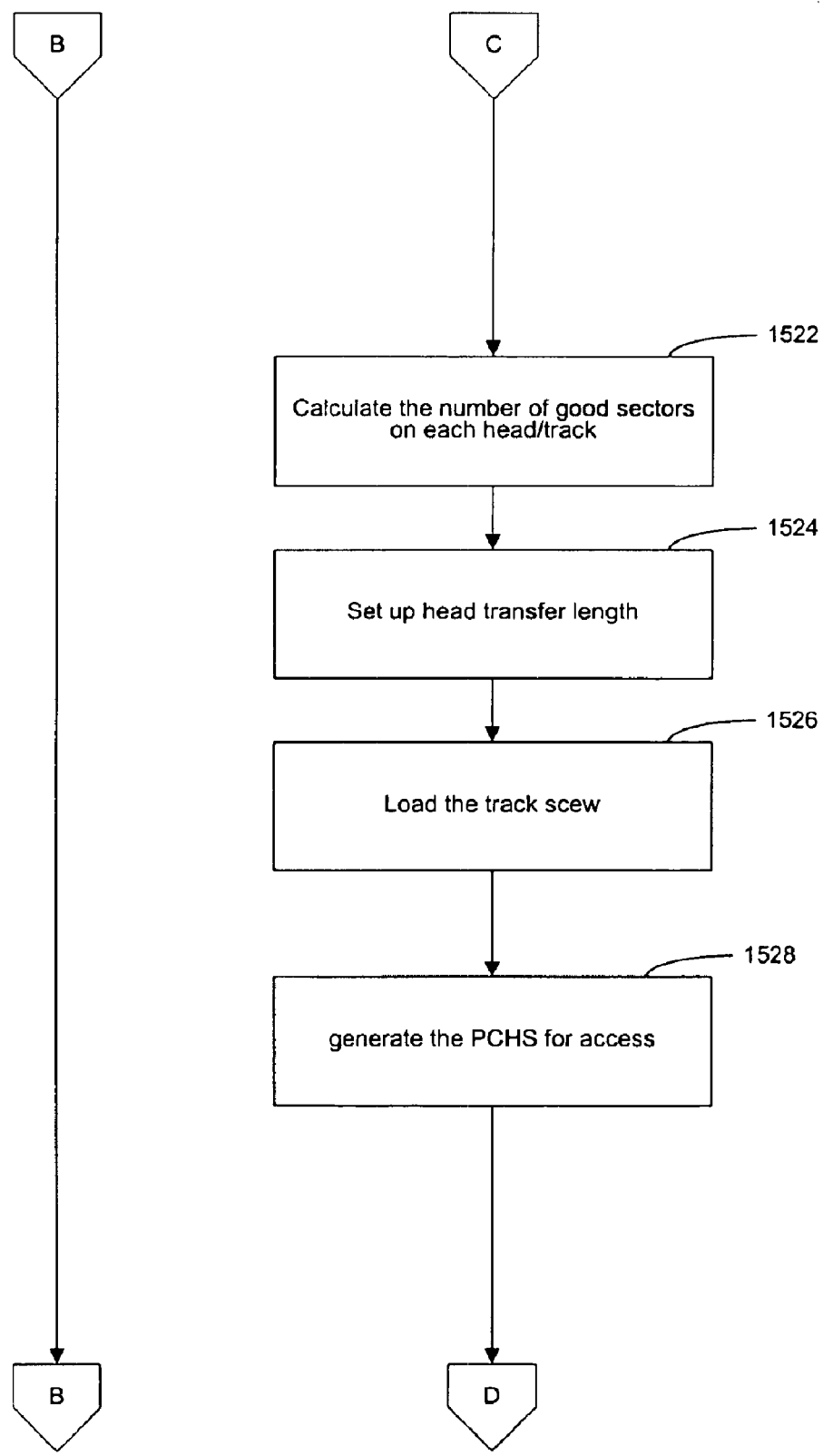
Figures 3, 15:
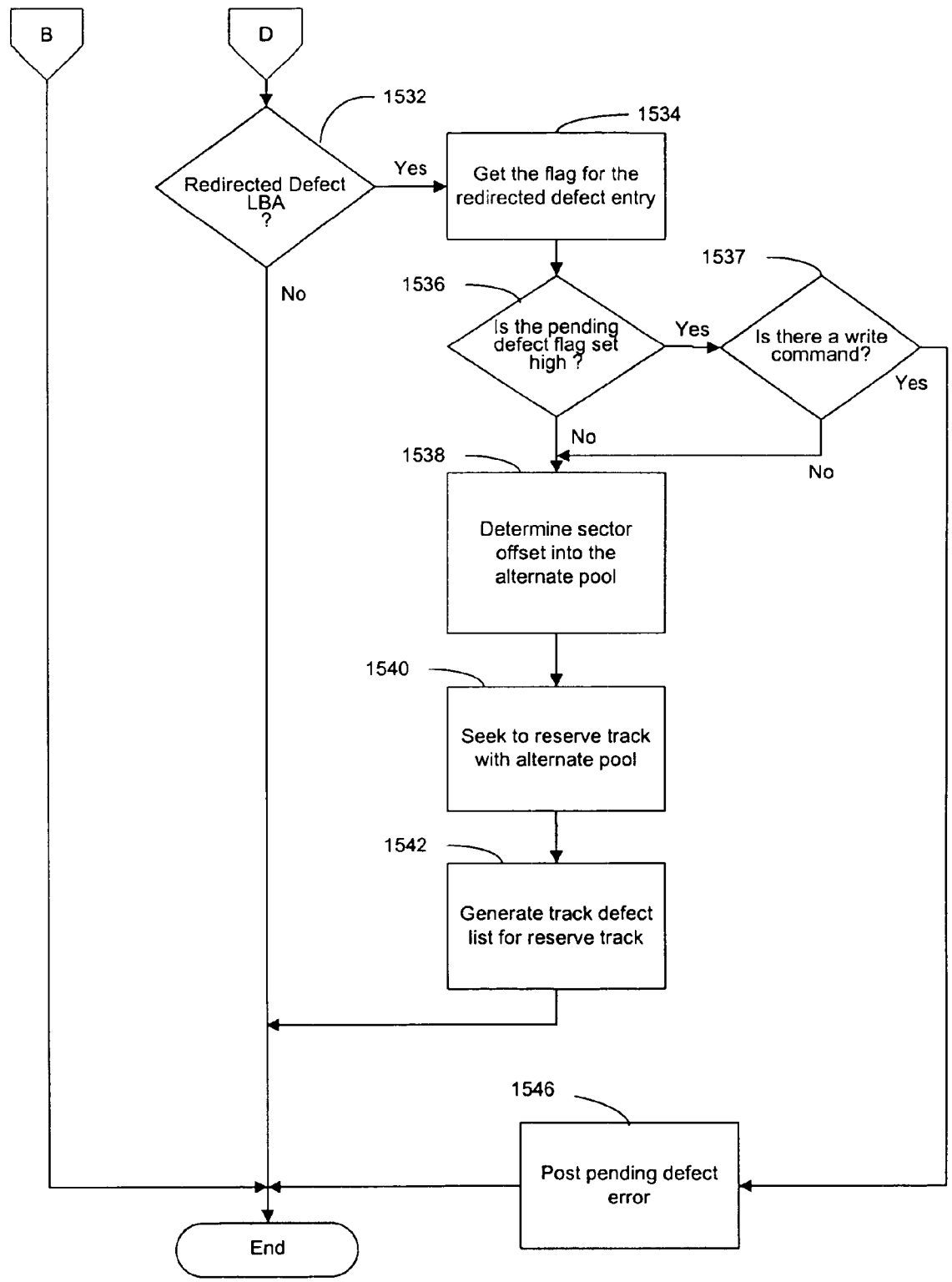

In operation 1538, the disc drive controller 142 determines the sector offset in the alternate sector pool. The alternate sector pool is a pool of reserve data sectors that is used to store the contents of the redirected LBAs. Referring to FIG. 17-1, shown therein is an example of the data redirected to and stored in the alternate sector pool. Each sector in the alternate sector pool is assigned a sequential number of alternate sector offset. For example, the first sector in the alternate sector pool is assigned the first alternate sector offset (e.g., redirected data #1 in FIG. 17-1); the second sector in the alternate sector pool is assigned the second alternate sector offset (e.g., redirected data #2 in FIG. 17-1); the fourth sector in the alternate sector pool is assigned the fourth alternate sector offset (e.g., redirected data #5 in FIG. 17-1), and so on and so forth. This alternate sector offset is determined by using the alternate sector slip list as shown in FIG. 17-2 and 17-3. The details of determining the redirected PCHS by using the alternate sector slip list is described with respect to FIGS. 17-2, and 17-3 below. By knowing the sector offset, the PCHS of the redirected reserve data sector is located. For example, referring again to FIG. 17-1, if the alternate sector offset were 5, the redirected PCHS would be PCHS 005 in the reserve data area. Once the PCHS of the redirected reserve data sector is determined, the head seeks to the redirected sector in the reserve data area in operation 1540 (FIG. 15.3). Once the seek operation to the reserve tracks is initiated, the track defect list for the reserve tracks are generated in operation 1542.

Figure 16:
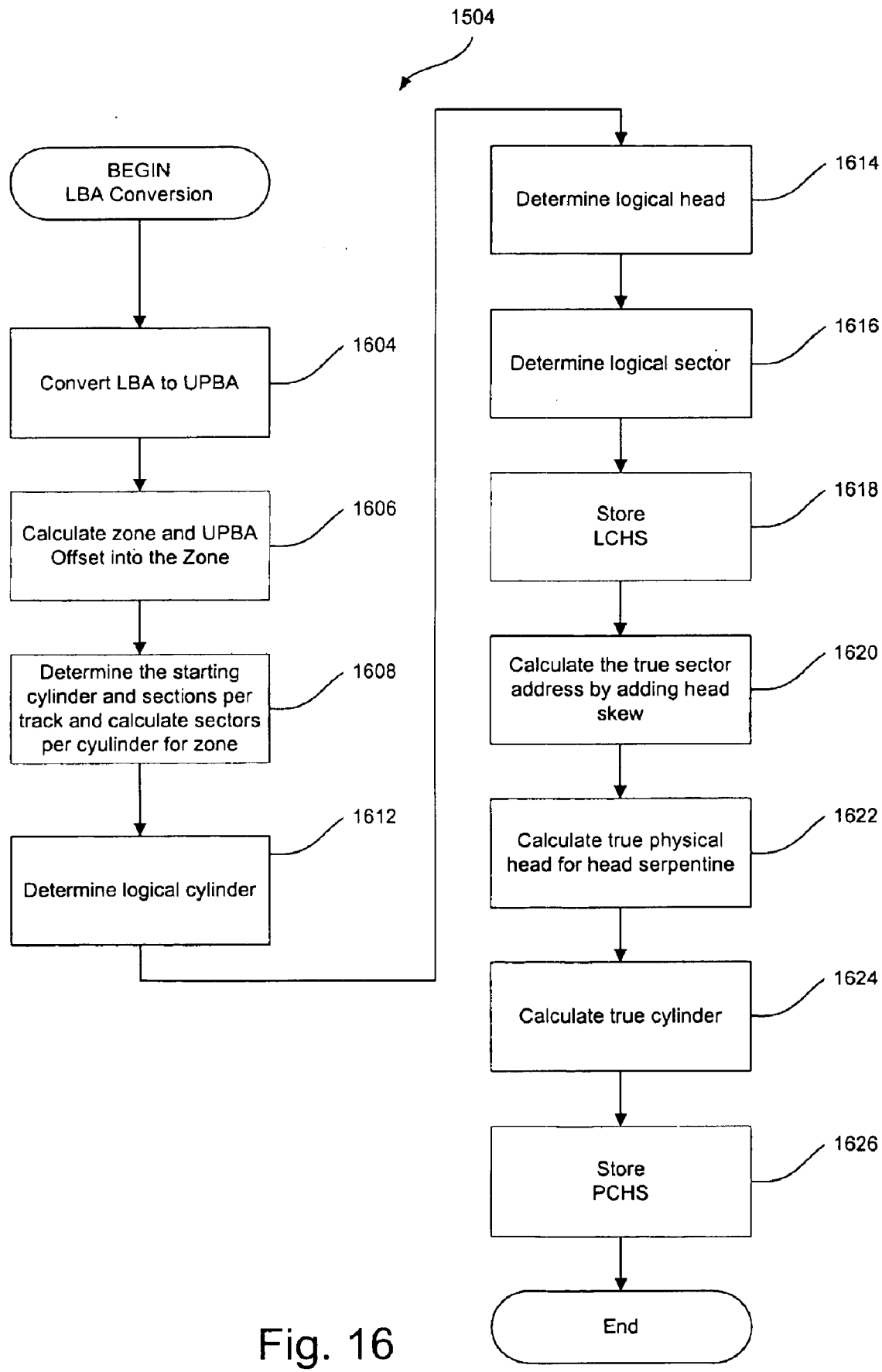
FIG. 16 is a LBA to PCHS conversion flowchart in accordance with a preferred embodiment of the invention.

Shown in FIG. 16 is a flowchart generally illustrating the LBA to LCHS to PCHS conversion operation 1504. LBA to LCHS or PCHS conversion operation requires the use of a user sector slip list such as that shown in FIG. 10-4. In operation 1604, a LBA is first converted into a UPBA in operation 1604 according to the following formula:

$$UPBA = LBA + \text{MAX(Slip Count)}$$

where MAX (Slip Count) is the maximum number of slip count assigned to the Next Good LBA that equals the LBA. If no Next Good LBA equals a LBA, the MAX (Slip Count)s for all LBAs that are less than one Next Good LBA is the Slip Count assigned to the Next Good LBA less one. The operation of converting LBA to UPBA using the above formula is described with respect to

TABLE 3

| | | LBA to UPBA Conversion | | |
|---|---|---|---|---|
| User sector slip list | | | MAX | |
| Next Good LBA | Slip Count | LBA | (Slip Count) | UPBA |
| | | 0 | 0 | 0 |
| | | 1 | 0 | 1 |
| | | 2 | 0 | 2 |
| 3 | 1 | 3 | 1 | 4 |
| 4 | 2 | N/A | N/A | N/A |
| 4 | 3 | 4 | 3 | 7 |
| | | 5 | 3 | 8 |
| 6 | 4 | N/A | N/A | N/A |
| 6 | 5 | N/A | N/A | N/A |
| 6 | 6 | 6 | 6 | 12 |
| | | 7 | 6 | 13 |
| | | 8 | 6 | 14 |
| | | 9 | 6 | 15 |
| | | 10 | 6 | 16 |
| 11 | 7 | 11 | 7 | 18 |
| 12 | 8 | 12 | 8 | 20 |

In converting LBAs 0, 1, and 2 into UPBAs, the disc drive controller examines the user sector slip list to see if there is any Next Good LBA corresponding to 0, 1, or 2. No Next Good LBA equals 0, 1, and 2. Thus, Slip Count of the next Next Good LBA is examined. The Next Good LBA then is Next Good LBA 3 that has a Slip Count of 1. Since no Next Good LBA equals 0, 1, or 2, the MAX (Slip Count) applicable to LBAs 0, 1, and 2 is 0 (that is, one less than the Slip Count of Next Good LBA 3). Once the MAX (Slip Count) is determined, by adding to the LBA, the corresponding UPBA is determined (that is, UPBA 0 for LBA 0; UPBA 1 for LBA 1; UPBA 2 for LBA 2).

For LBA 3, a Next Good LBA of 3 in the user data table equals the LBA of 3. Thus, the MAX (Slip Count) corresponding to LBA 3 is the Slip Count assigned to Next Good LBA 3 (that is, 1). Therefore, the UPBA corresponding to LBA 3 is 4.

For LBA 4, there are two entries of Next Good LBA 4 in the user data table. One entry is Slip Count of 2 and the other is Slip Count 3. Thus, the MAX (Slip Count) corresponding to the Next Good LBA 4 is 3. 3 is then added to LBA 3 to determine the corresponding UPBA 7.

For LBA 5, the next closest Next Good LBA in the user sector slip list is Next Good LBA 6. Then the Next Good LBA corresponding to LBA 5 is the Slip Count assigned to Next Good LBA 6 less 1. Slip Count of 4 is assigned to Next Good LBA 6, thus the MAX (Slip Count) for LBA 5 is 3, same as that for LBA 4. 3 is then added to LBA 5 to determine the corresponding UPBA 7.

For converting LBA 9 into a UPBA, the next closest Next Good LBA to LBA 9 is Next Good LBA 11 which has a Slip Count of 7. Thus, the MAX (Slip Count) corresponding to LBA 9 is 6, and UPBA corresponding to LBA 9 is 15.

Applying the conversion formula, a slipped LBA is converted to a corresponding UPBA using the user sector slip list. Once the starting LBA is converted into a UPBA, the zone in which the UPBA is located is determined in operation 1606. Also in operation 1606, the offset of the UPBA from the beginning of the zone is determined. In the PBA Zone Table, such as that shown in FIG. 10-5, the PBA to zone assignment table 1052 describes which set of PBA numbers are located in what zone. For example, in the PBA to zone assignment table 1052, UPBA numbers 0–99 are in zone 0; 100–199 are in zone 1, etc. Then the LBA 9 or UPBA 15 is located in zone 0. Further, the sector offset for LBA 9 is also 15 since zone 0 begins with PBA 0.

Now that the zone location and sector offset into zone is determined, the disc controller determines the physical address of the target sector in the zone by first converting UPBA of the target sector into LCHS in operations 1612, 1614, and 1616, and thereafter converts the LCHS to PCHS in operations 1620, 1622, and 1624 by adding the head skew and head serpentine to the LCHS.

The logical cylinder location is determined in operation 1612 according to the following formula:

$$\text{(Logical Cylinder)} = MOD[(UPBA \text{ Offset}_{ZONE})/(\text{Sectors Per Cylinder})]$$

where (UPBA Offset$_{ZONE}$) is the sector offset into the zone determined in operation 1606, and (Sectors Per Cylinder) is the sector density for that given zone determined in the PBA Zone Table such as that in FIG. 10-5.

In operation 1606, it was determined that (UPBA Offset$_{ZONE}$) for LBA 9 or UPBA 15 was 15. Further, Sectors Per Cylinder of 20 can be determined by examining the PBA Zone Table, in the same way as it was already determined in operation 1052. Thus, the Logical Cylinder for LBA 9 is 0 (that is, MOD (15/20)=0).

The logical head location is determined in operation 1614 according to the following formula:

$$\text{(Logical Cylinder Head)} = MOD\left[REM\left(\frac{(UPBA \text{ Offset}_{ZONE})}{(\text{Sectors Per Cylinder})}\right) \Big/ (\text{Sectors Per Track})\right]$$

For LBA 9 or UPBA 15, it was previously determined that (UPBA Offset$_{ZONE}$) is 15. From the PBA Zone Table, the Sectors Per Track of 10 and Sectors Per Cylinder of 20 are also determined. Plugging the values into the formula, Logical Cylinder Head of 1 is also determined (that is, MOD [(REM (15/20))/15]=MOD (15/10)=1).

The logical sector location is then determined in operation 1616 according to the following formula.

$$\text{(Logical Head)} = REM\left[REM\left(\frac{(UPBA \text{ Offset}_{ZONE})}{(\text{Sectors Per Cylinder})}\right) \Big/ (\text{Sectors Per Track})\right]$$

Again, it was previously determined that (UPBA Offset$_{ZONE}$) is 15 for LBA 9 or UPBA 15. Further, from the PBA Zone Table, the Sectors Per Track of 10 and Sectors Per Cylinder of 20 are also determined. Plugging the values into the formula, Logical Head of 5 is also determined (that is, REM [(REM (15/20))/15]=REM (15/10)=5).

Thus, LBAs are converted to LCHS in operations 1612, 1614, and 1616. For example, LBA 9 or UPBA 15 corresponds to LCHS 015. Once the LCHS is determined, it is stored in a memory (e.g., reserve data area, disc drive controller memory, host memory, etc.) in operation 1618.

Referring now to FIG. 12, the PCHS corresponding to LBA 9 is PCHS 010. LCHS and PCHS of a sector assigned with a LBA does not equal, because discs in a disc drive are formatted with complex data organizational structures, such as ZBA, to pack as many sectors as possible in a give zone. Thus, LCHS needs to be adjusted in order to determine the corresponding PCHS.

Physical Sector is determined by incorporating a head skew into the logical sector in operation 1620 according to the following formula:

$$(\text{Physical Sector}) = MOD\left[\frac{(\text{Logical Sector}) + (\text{Head Skew})}{(\text{Sectors Per Track})}\right]$$

For example, it was previously determined that (Logical Sector) is 5 for LBA 9 or LPBA 15. Further, from the PBA Zone Table, the Sectors Per Track of 10 and Head Skew of 5 are also determined. Plugging the values into the formula, Physical Sector of 0 is determined (that is, MOD [(5+5)/10]=MOD (10/10)=0).

Moreover, Physical Head is determined by incorporating a head serpentine into the logical head in operation 1622 according to the following formula:

(Physical Head)=(Logical Head)

if the (Logical Head) is in an even numbered cylinder; or (Physical Head)=[MAX (Logical Head)]-(Logical Head)

if the (Logical Head) is in an odd numbered cylinder. For example, it was previously determined that (Logical Cylinder) is 0 and (Logical Head) is 5 for LBA 9 or UPBA 15. Plugging the values into the formula, Physical Head of 1 is determined (that is, same as the Logical Head since the Logical Cylinder is a even number).

Lastly, Physical Cylinder is determined by incorporating a skip cylinder into the logical cylinder in operation 1624 according to the following formula:

(Physical Cylinder)=(Logical Cylinder)+(Number of Skipped Cylinder up to the Logical Cylinder).

For example, if Logical Cylinder is nine, but, in the PBA Zone Table, it is determined that cylinders 4, 5, 8, and 10 are skipped. Since cylinder numbers of the three skipped cylinders (4, 5, and 8) are less than the number of the Logical Cylinder 9, Physical Cylinder can be determined by adding 3 to the Logical Cylinder number 9.

For LBA 9 or UPBA 15, the Logical Cylinder was determined to be 0. Since no cylinders were skipped before the cylinder 0, the Physical Cylinder number of LBA 9 is same as the Logical Cylinder 0. Thus, PCHS 010 correctly corresponds to LBA 9 or UPBA 15 as shown in FIG. 12. Once the PCHS is determined, it is stored in a memory in operation 1626 and completes the LBA to LCHS or PHCS conversion operation 1504.

Now referring to FIGS. 17-1, 17-2, and 17-3, shown therein is an example of alternate sector pool and an alternate sector list according to the exemplary preferred embodiment of the present invention. The alternate sector list is made up of two parts: an alternate sector list header in FIG. 17-2 and an alternate sector entry list in FIG. 17-3. The alternate sector entry list contains information regarding the alternate sector offset of the redirected data stored in the alternate sector pool in the reserve data area as shown in FIG. 17-1 and a next entry pointer indicating what entry in the alternate sector entry list is to be operated the next. The alternate sector list head initially contains the head pointer indicating which entry in the alternate sector entry list contains the alternate sector offset to the first redirected LBA from the user data area. Thereafter, the head pointer in the alternate sector list header is updated based on the next entry pointer in the alternate sector entry list.

For example, now referring again to FIG. 12, LBAs 3, 6, and 11 are newly-identified defective sectors. Thus, each data corresponding to each of LBAs 3, 6, and 11 is redirected to an alternate sector pool in the reserve data in operations 1314, 1316, and 1318. That is, the data #1 corresponding to LBA 3 is redirected to alternate sector offset 0; the data #2 corresponding to LBA 6 is redirected to alternate sector offset 1; and the data #3 which corresponds to LBA 11 is redirected to alternate sector offset.

As the data are redirected, the alternate sector list header (the header) and the alternate sector entry list are (the entry list) updated. The header is updated only once for the very first redirecting operation; however, the entry list is updated each time the redirecting operation is performed. That is, for redirecting data #1, the alternate sector offset 0 (in FIG. 17-1) is updated in the alternate sector entry list (in FIG. 17-3). The order in which the alternate sector entry (in FIG.17-3) is updated is not sequential; therefore, the entry can be updated in any open queue in the list (in FIG.7-3). Thus, for example, entry 3 can be updated in the entry list before entry I is updated following next with entry 9, then with entry 6, etc. According to the example shown with respect to FIG. 17-3, the alternate sector offset corresponding to data #1 is updated in the queue of entry number #3 rather than in entry #1. This update in the queue of entry number 3 in the entry list is shown in Table 4. Because this is the very first update in the entry list, the header is updated with the header pointer of 3. This means that alternate sector offset to the redirected data is stored in the third entry number in the entry list.

TABLE 4

Alternate Sector Entry List

| Entry Number | Alternate Sector Offset | Next Entry Pointer |
|---|---|---|
| 3 | 0 | 6 |

The next entry pointer 6 indicates that at the entry number 6 in the entry list is the next available entry queue in which the next alternate sector offset is to be stored. For example, data #2 is stored in the alternate sector offset 1 (in FIG. 17-1). Thus, in entry number 6 in the entry list, not entry number 4, become the next queue to update the alternate sector offset 1 of data 2.

TABLE 5

Alternate Sector Entry List

| Entry Number | Alternate Sector Offset | Next Entry Pointer |
|---|---|---|
| 3 | 0 | 6 |
| 4 | | |
| 5 | | |
| 6 | 1 | 1 | the entry number 6 is the next queue, because the header pointed to entry number 3 for the first data, and the entry number 3 in the entry list pointed to the entry number 6.

The entry number 6 (which contains alternate sector offset of data #2) then points to entry number 1 for the next update. Thus, entry number 1 in the entry list is used to update the alternate sector offset of data #3, which is 2, as shown in Table 6.

TABLE 6

Alternate Sector Entry List

| Entry Number | Alternate Sector Offset | Next Entry Pointer |
|---|---|---|
| 1 | 2 | 2 |
| 2 | | |
| 3 | | |
| 3 | 0 | 6 |
| 4 | | |
| 5 | | |
| 6 | 1 | 1 |

The subsequent redirected data such as data #4, #5, #6, #7, etc. as shown in FIG. 17-1 is updated in the alternate sector list header and in the alternate sector entry list in the same manner as described above with respect to Tables 4, 5, and 6.

For accessing a redirected data, the disc controller first looks to the header to determine where in the entry list the alternate sector offset, which stores the next redirected data, is located. For example, now referring to FIG. 12, the disc controller looks to the header first in order to access the data of the redirected LBA 3. Referring to FIG. 17-1, The data #1 of LBA 3 is redirected to an alternate sector offset 0. The header pointer of 3 then indicates that the alternate sector offset to data #1 is located in the queue of entry number 3. The disc controller then retrieves the alternate sector offset information from the entry number 3 in the entry list. As shown in Table 6 and FIG. 17-3, the alternate sector offset found in queue of entry number 3 is 0. Thus, the head seeks to the $0^{th}$ sector of the alternate sector pool in the reserve data area as shown in FIG. 17-1. The head also updates the header with a new pointer to indicate where in the entry list the next alternate sector offset is stored. That is, the next entry pointer is 6 in the queue of entry number 3 as shown in Table 6 and FIG. 17-3. Thus, the header is updated with 6 as shown in FIG. 17-2 (row $t_1$). After accessing the data #1, alternate sector offset of 1 is determined as the reserve sector that stores the data #2, since the header points to the entry number 6 in the entry list. The head then seeks to the $1^{st}$ sector in the alternate pool of sector as shown in FIG. 17-1. The header is further updated with 1, as the next entry pointer 1 is found in the queue of entry number 6. The same logic applies to accessing data #3, #4, #5, etc.

In summary, the present invention may be viewed as a method of full volume slipping logical block addresses (LBAs) of data (such as in operations 408 through 412) in a data storage device (such as 100). A data storage area (such as 108) has user data sectors (such as 312) and reserve data sectors (such as 312). Each sector (such as 312) in the data storage area (such as 108) has a physical cylinder head sector address (PCHS). The full volume slipping method (such as in operation 408) involves identifying a defective sector in a user data area (such as in operation 714) and generating sequentially numbered LBA (such as in operations 714–728) wherein that the total number of LBAs equals the total number of user physical block addresses (UPBAs) of user sectors (such as 312). Each LBA represents a logical address of a good sector in the user data area such that a first LBA corresponds to the UPBA of a first good sector in the user data area and the LBA of a first good user spare sector consecutively follows the LBA of a last good user sector. The user data area has user sectors and user spare sectors (such as 312). The UPBAs are sequentially numbered with the UPBA of the user spare sectors being larger than the UPBA of the user sectors. Further, a first UPBA corresponding to a first PCHS represents a first user sector. A last UPBA corresponds to a last PCHS representing a last user spare sector.

Further, the full volume slipping method (such as in operations 902 through 916) involves generating a Next Good LBA (such as in operation 910), assigning a Slip Count to each Next Good LBA (such as in operation 912), and generating a user sector slip list (such as in operation 914). The user sector slip list (such as in operation 914) has an entry comprising the PCHS, the UPBA, the Next Good LBA, and the Slip Count related to a slipped defective sector (such as 808, 812 or 814).

The method according to the invention may also include the reserve data area having one or more reserve tracks. Each reserve track includes a reserve sector (such as 312) and a reserve spare sector. Each sector in the reserve track has a physical block address (PBA). The PBAs are sequentially numbered in the reserve track. The reserve sector is numbered before the reserve spare sector and thus will have a smaller number. A first PBA in the reserve track corresponds to a first PCHS representing a first reserve sector in the reserve track and a last PBA corresponds to a last PCHS representing the last reserve spare sector in the reserve track. In this instance, the method further may involve slipping defective sectors in a reserve data area (such as in operations 502 through 520) by identifying a defective sector in the reserve track (such as in operation 506) and generating a reserve slip list (such as in operation 508) having an entry comprising the PCHS and PBA of the defective sector.

Additionally, the invention may be viewed as a method for redirecting a logical block address (LBA) (such as in operations 1104 and 1106) of a newly identified defective sector (such as in operation 1104) in a user data area (such as 312) in a data storage device (such as 100). In such a data storage device (such as 100) there is a data storage area (such as 108) that is made up of a user data area of sectors (such as 312) and a reserve data area of sectors (such as 312). The redirecting method involves slipping the LBA corresponding to a defective sector in the user data area over a full volume of the user data area (such as in operations 408 through 412) and redirecting the LBA of the newly-identified defective sector in the user data area to a good sector in the reserve data area (such as in operations 1532 through 1542). The user data area is made up of a user sector and a user spare sector. Each sector (such as 312) in the user data area has a user physical block address (UPBA). The UPBAs are sequentially numbered, and the UPBA of the user sector is numbered before the UPBA of the user spare sector (such as in FIG. 8). A first UPBA (such as 802) corresponding to a first physical cylinder head sector address (PCHS) represents a first user sector (such as 312). A first UPBA corresponding to a first PCHS representing a first user spare sector (such as 312) consecutively follows a last UPBA corresponding to a last PCHS representing a last user sector. A last UPBA corresponds to a last PCHS representing a last user spare sector.

The redirecting method further involves identifying a defective sector in a user data area (such as in operations 712–718) and generating sequentially numbered LBAs (such as in operations 714–728) in such a way that: the total number of LBAs equals the total number of UPBAs (such as 802); each LBA represents a logical address of a good sector in the user data area; a first LBA corresponds to the UPBA of a first good sector in the user data area; and the LBA of a first good user spare sector consecutively follows the LBA of a last good user sector (such as 312).

The redirecting method (such as in operations 902–916) further involves generating a Next Good LBAs (such as in operation 910); assigning a Slip Count to each Next Good LBA (such as in operation 912); and generating a user sector slip list (such as in operation 914). The user slip list comprises an entry having the Next Good LBA (such as is shown in FIG. 10-3) and the Slip Count (such as is shown in FIG. 10-4) related to a slipped defective sector.

The data storage area (such as on disc 108) has a reserve data area made up of reserve tracks (such as 310). Each reserve track (such as 310) is made up of a reserve sector (such as 312) and a reserve spare sector (such as 312). Each sector in the reserve track (such as 310) has a physical block address (PBA). The PBAs are sequentially numbered. The PBA of the reserve sector is numbered before the PBA of the reserve spare sector. A first PBA corresponds to a first PCHS representing a first reserve sector in the reserve track. A last PBA corresponds to a last PCHS representing the last reserve spare sector in the reserve track.

The redirecting operation (such as in operations 402) further involve identifying a defective sector in each reserve track (such as in operation 506), and generating a reserve slip list comprising an entry having the PCHS and PBA, of the defective sector (such as in operation 508).

The redirecting operation (such as in operations 1102) also involve identifying the newly-identified defective sector in the user data area (such as in operations 1304 through 1312) and generating an alternated sector list (such as in operations 1106) having a header (such as is shown in FIG. 17-2) and an entry (such as is shown in FIG. 17-3) comprising an alternated sector address and a next entry pointer.

Further, the invention may be viewed as a data access operation (such as in operation 1402) in a data storage device (such as 100) having a user data area of sectors (such as 312) and a reserve data area of sectors (such as 312). Each sector has a physical cylinder head sector address (PCHS), and each sector in the user data area has a user physical block address (UPBA) (such as 802). The UPBAs are sequentially numbered. The data access operation involves receiving a data access command including a logical block address (LBA) and determining the PCHS corresponding to the LBA using a user sector slip list (such as in operations 1404 through 1408).

The data access operation further involves converting the LBA into a UPBA using the user sector slip list (such as in operation 1406), and determining the PCHS corresponding to the UPBA (such as 802). Further, data access operation (such as operation 1402) involves determining the PCHS corresponding to the LBA using an alternate sector list (such as in operation 1408). Then the operation to convert LBA to PCHS involves converting the LBA into a UPBA using the user sector slip list, determining if the UPBA is redirected or alternated to the reserve data area, and determining the PCHS of an alternated sector in the reserve data area corresponding to the UPBA (such as 802).

Alternatively the present invention may be viewed as a data storage device (such as 100) that has a data storage area (such as 108) having user data sectors (such as 312) in a user data area and reserve data sectors (such as 312) in a reserve data area wherein each sector in the data storage area has a physical cylinder head sector address (PCHS). The device (such as 100) also has a controller operable (such as in operation 400) to full volume slip logical block addresses (LBAs) by identifying a defective sector (such as in operations 714 and 716) in the user data area (such as in operation 408), and generating sequentially numbered LBAs (such as in operations 720 and 722). The total number of LBAs equals the total number of user physical block addresses (UPBAs) (such as 802) of user sectors, each LBA representing a logical address of a good sector in the user data area. A first LBA corresponds to the UPBA of a first good sector in the user data area and the LBA of a first good user spare sector consecutively follows the LBA of a last good user sector.

The user data area has a user sector and a user spare sector. The UPBAs are sequentially numbered with the UPBA (such as 802) of the user spare sector being larger than the UPBA of the user sector, and a first UPBA (such as 802) corresponds to a first PCHS representing a first user sector (such as 312) and a last UPBA (such as 802) corresponds to a last PCHS representing a last user spare sector (such as 312). The controller generates (such as in operations 902 through 916) a Next Good LBA (such as in operation 910) and assigns a Slip Count to each Next Good LBA (such as in operation 912), and generates a user sector slip list (such as in operation 914) having an entry comprising the PCHS, the UPBA, the Next Good LBA, and the Slip Count related to a slipped defective sector.

The data storage device also has a reserve track (such as 310) in the reserve data area having a reserve sector (such as 312) and a reserve spare sector, each sector (such as 312) in the reserve track having a physical block address (PBA) (such as shown in FIG. 6), wherein PBAs are sequentially numbered with the reserve sector being numbered before the reserve spare sector. A first PBA corresponding to a first PCHS represents a first reserve sector (such as 312) in the reserve track and a last PBA corresponding to a last PCHS representing the last reserve spare sector in the reserve track. The controller is operable (such as in operations 502 through 516) to identify a defective sector (such as in operation 506) in the reserve track and generate a reserve slip list (such as in operation 508) having an entry comprising the PCHS and PBA of the defective sector.

It will be clear that the present invention is well adapted to attain the ends and advantages mentioned as well as those inherent therein. While a presently preferred embodiment has been described for purposes of this disclosure, numerous changes may be made which will readily suggest themselves to those skilled in the art and which are encompassed in the spirit of the invention disclosed and as defined in the appended claims.

What is claimed is:

1. A method of full volume slipping of logical block addresses (LBAs) in a data storage device comprising a data storage area having user data sectors in a user data area and reserve data sectors in a reserve data area wherein each sector in the data storage area has a physical cylinder head sector address (PCHS), the method comprising steps of:

(a) identifying a defective sector in the user data area; and
  (b) generating sequentially numbered LBAs wherein the total number of LBAs equals the total number of user physical block addresses (UPBAs) of user sectors, each LBA representing a logical address of a good sector in the user data area, wherein a first LBA corresponds to the UPBA of a first good sector in the user data area, and the LBA of a first good user spare sector consecutively follows the LBA of a last good user sector.

2. The method of full volume slipping according to claim 1, wherein the user data area has a user sector and a user spare sector.

3. The method of full volume slipping according to claim 2, wherein the UPBAs are sequentially numbered with the UPBA of the user spare sector being larger than the UPBA of the user sector, and wherein a first UPBA corresponds to a first PCHS representing a first user sector and a last UPBA corresponds to a last PCHS representing a last user spare sector.

4. The method of full volume slipping according to claim 3 wherein the data storage area having the reserve data area includes a reserve track, each reserve track having a reserve sector and a reserve spare sector, each sector in the reserve track having a physical block address (PBA), wherein the PBAs are sequentially numbered, the reserve sector being numbered before the reserve spare sector, a first PBA corresponding to a first PCHS representing a first reserve sector in the reserve track and a last PBA corresponding to a last PCHS representing the last reserve spare sector in the reserve track, the method further comprising steps of:

(c) identifying a defective sector in the reserve track; and (d) generating a reserve slip list having an entry comprising the PCHS and PBA, of the defective sector.

5. The method of full volume slipping according to claim 1, wherein the generating step (b) comprises steps of:

(b)(i) generating a Next Good LBA;

(b)(ii) assigning a Slip Count to each Next Good LBA; and (b)(iii) generating a user sector slip list having an entry comprising the PCHS, the UPBA, the Next Good LBA, and the Slip Count related to a slipped defective sector.

6. A method of redirecting a logical block address (LBA) of a newly-identified defective sector in a user data area in a data storage device having a data storage area having a user data area of sectors and a reserve data area of sectors, the method comprising steps of:

(a) slipping the LBA corresponding to a defective sector in the user data area over a full volume of the user data area; and (b) redirecting the LBA of the newly-identified defective sector in the user data area to a good sector in the reserve data area.

7. The method of redirecting a LBA according to claim 6, wherein the user data area comprises a user sector and a user spare sector, each sector in the user data area having a user physical block address (UPBA), wherein the UPBAs are sequentially numbered, the UPBA of the user sector being numbered before the UPBA of the user spare sector, a first UPBA corresponding to a first physical cylinder head sector address (PCHS) representing a first user sector, a first UPBA corresponding to a first PCHS representing a first user spare sector consecutively following a last UPBA corresponding to a last PCHS representing a last user sector, and a last UPBA corresponding to a last PCHS representing a last user spare sector, and wherein the step of slipping the LBA corresponding to a defective sector in the user area further comprising steps of:

(c) identifying a defective sector in a user data area; and (d) generating sequentially numbered LBAs wherein the total number of LBAs equals the total number of UPBAs, each LBA representing a logical address of a good sector in the user data area, a first LBA corresponding to the UPBA of a first good sector in the user data area, and the LBA of a first good user spare sector consecutively following the LBA of a last good user sector.

8. The method of redirecting a LBA according to claim 7, wherein the generating step (d) of the sequentially numbered LBAs further comprises steps of:

(d)(i) generating a Next Good LBAs;

(d)(ii) assigning a Slip Count to each Next Good LBA; and (d)(iii) generating a user sector slip list comprising an entry having the PCHS, the UPBA, the Next Good LBA, and the Slip Count related to a slipped defective sector.

9. The method of redirecting a LBA according to claim 8 in the data storage area having the reserve data area comprising a reserve track, each reserve track comprising a reserve sector and a reserve spare sector, each sector in the reserve track having a physical block address (PBA), wherein PBAS are sequentially numbered, PBA of the reserve sector being numbered before PBA of the reserve spare sector, a first PBA corresponding to a first PCHS representing a first reserve sector in the reserve track and a last PBA corresponding to a last PCHS representing the last reserve spare sector in the reserve track, the method further comprising steps of:

(e) identifying a defective sector in each reserve track; and (f) generating a reserve slip list comprising an entry having the PCHS and PBA, of the defective sector.

10. The method of redirecting a LBA according to claim 9, wherein the redirecting step (b) further comprises steps of:

(b)(i) identifying the newly-identified defective sector in the user data area; and (b)(ii) generating an alternated sector list having a header and an entry comprising an alternated sector address and a next entry pointer.

11. A data storage device comprising:

a data storage area having user data sectors in a user data area and reserve data sectors in a reserve data area wherein each sector in the data storage area has a physical cylinder head sector address (PCHS); and a controller operable to full volume slip logical block addresses (LBAs) by identifying a defective sector in the user data area, and generating sequentially numbered LBAs wherein the total number of LBAs equals the total number of user physical block addresses (UPBAs) of user sectors, each LBA representing a logical address of a good sector in the user data area, wherein a first LBA corresponds to the UPBA of a first good sector in the user data area, and the LBA of a first good user spare sector consecutively follows the LBA of a last good user sector.

12. The data storage device according to claim 11, wherein the user data area has a user sector and a user spare sector.

13. The data storage device according to claim 12 wherein the UPBAs are sequentially numbered with the UPBA of the user spare sector being larger than the UPBA of the user sector, and wherein a first UPBA corresponds to a first PCHS representing a first user sector and a last UPBA corresponds to a last PCHS representing a last user spare sector.

14. The data storage device according to claim 13, wherein the controller generates a Next Good LBA and assigns a Slip Count to each Next Good LBA, and generates a user sector sup list having an entry comprising the PCHS, the UPBA, the Next Good LBA, and the Slip Count related to a slipped defective sector.

15. The data storage device according to claim 14 further comprising:

a reserve track in the reserve data area having a reserve sector and a reserve spare sector, each sector in the reserve track having a physical block address (PBA), wherein PBAs are sequentially numbered with the reserve sector being numbered before the reserve spare sector;

a first PBA corresponding to a first PCHS representing a first reserve sector in the reserve track and a last PBA corresponding to a last PCHS representing the last reserve spare sector in the reserve track.

16. The data storage device according to claim 15 wherein the controller is operable to identify a defective sector in the reserve track and generate a reserve slip list having an entry comprising the PCHS and PBA of the defective sector.

17. A disc drive operable with a disc, the drive comprising:

an information storage media on at least one surface of the disc having concentric tracks defined on the media and radial aligned sectors on adjacent trucks; and means for slipping a logical block address (LBA) corresponding to a defective sector in a user data area over a full volume of the user data area.

* * * * *